(12) United States Patent
Dowling

(10) Patent No.: US 6,760,833 B1
(45) Date of Patent: Jul. 6, 2004

(54) SPLIT EMBEDDED DRAM PROCESSOR

(75) Inventor: Eric M. Dowling, Richardson, TX (US)

(73) Assignee: Micron Technology, Inc., Boise, ID (US)

(*) Notice: Subject to any disclaimer, the term of this patent is extended or adjusted under 35 U.S.C. 154(b) by 853 days.

(21) Appl. No.: 09/652,638

(22) Filed: Aug. 31, 2000

Related U.S. Application Data

(60) Continuation of application No. 09/487,639, filed on Jan. 19, 2000, now Pat. No. 6,226,738, which is a division of application No. 08/997,364, filed on Dec. 23, 1997, now Pat. No. 6,026,478.

(60) Provisional application No. 60/054,546, filed on Aug. 1, 1997.

(51) Int. Cl.[7] ............................................. G06F 19/00
(52) U.S. Cl. ........................................ 712/34; 711/105
(58) Field of Search ............................ 712/34; 711/105

(56) References Cited

U.S. PATENT DOCUMENTS

| | | | |
|---|---|---|---|
| 4,701,844 A | | 10/1987 | Thompson et al. |
| 4,796,175 A | | 1/1989 | Matsuo et al. |
| 5,010,477 A | | 4/1991 | Omada et al. |
| 5,175,835 A | | 12/1992 | Beighe et al. |
| 5,203,002 A | | 4/1993 | Wetzel |
| 5,317,709 A | | 5/1994 | Sugimoto |
| 5,396,641 A | | 3/1995 | Iobst et al. |
| 5,475,631 A | * | 12/1995 | Parkinson et al. ............ 712/15 |
| 5,485,624 A | | 1/1996 | Steinmetz et al. |
| 5,584,034 A | | 12/1996 | Usami et al. |
| 5,588,118 A | | 12/1996 | Mandava et al. |
| 5,594,917 A | | 1/1997 | Palermo et al. |
| 5,619,665 A | | 4/1997 | Emma |
| 5,787,303 A | | 7/1998 | Ishikawa |
| 5,805,850 A | | 9/1998 | Luick |
| 5,852,741 A | | 12/1998 | Jacobs et al. |
| 5,862,396 A | | 1/1999 | Motomura |
| 5,923,893 A | | 7/1999 | Moyer et al. |
| 5,978,838 A | | 11/1999 | Mohamed et al. |
| 6,026,478 A | | 2/2000 | Dowling |

FOREIGN PATENT DOCUMENTS

| | | |
|---|---|---|
| EP | 0 584 783 A2 | 8/1993 |
| GB | 2 244 828 A | 3/1990 |

OTHER PUBLICATIONS

Keeton, et al., "IRAM and SmartSIMM: Overcoming the I/O Bus Bottleneck," Computer Science Division, University of California at Berkeley (Jun. 1997) pp. 1–9.

Papamichalis, Panos, et al., "The TMS320C30 Floating–Point Digital Signal Processor", IEEE Micro, (Dec. 1988) pp. 13–29.

\* cited by examiner

*Primary Examiner*—William Treat
(74) *Attorney, Agent, or Firm*—Gazdzinski & Associates

(57) ABSTRACT

A processing architecture includes a first CPU core portion coupled to a second embedded dynamic random access memory (DRAM) portion. These architectural components jointly implement a single processor and instruction set. Advantageously, the embedded logic on the DRAM chip implements the memory intensive processing tasks, thus reducing the amount of traffic that needs to be bussed back and forth between the CPU core and the embedded DRAM chips. The embedded DRAM logic monitors and manipulates the instruction stream into the CPU core. The architecture of the instruction set, data paths, addressing, control, caching, and interfaces are developed to allow the system to operate using a standard programming model. Specialized video and graphics processing systems are developed. Also, an extended very long instruction word (VLIW) architecture implemented as a primary VLIW processor coupled to an embedded DRAM VLIW extension processor efficiently deals with memory intensive tasks. In different embodiments, standard software can be accelerated either with or without the express knowledge of the processor.

20 Claims, 11 Drawing Sheets

SPLIT EMBEDDED DRAM PROCESSOR

REFERENCE TO RELATED APPLICATIONS

The present application is a continuation of U.S. application Ser. No. 09/487,639 filed Jan. 19, 2000, entitled "Split Embedded DRAM Processor", now U.S. Pat. No. 6,226,738, which is a divisional application of U.S. application Ser. No. 08/997,364 filed Dec. 23, 1997, now U.S. Pat. No. 6,026,478 issued Feb. 15, 2000, which claims priority benefit of Provisional Application No. 60/054,546 filed Aug. 1, 1997.

BACKGROUND OF THE INVENTION

1. Field of the Invention

The present invention relates to the fields of microprocessor and embedded DRAM architectures. More particularly, the invention pertains to a split processor architecture whereby a CPU portion performs standard processing and control functions, an embedded DRAM portion performs memory-intensive manipulations, and the CPU and embedded DRAM portions function in concert to execute a single program.

2. Description of the Prior Art

Microprocessor technology continues to evolve rapidly. Every few years processor circuit speeds double, and the amount of logic that can be implemented on a single chip increases similarly. In addition, RISC, superscalar, very long instruction word (VLIW), and other architectural advances enable the processor to perform more useful work per clock cycle. Meanwhile, the number of DRAM cells per chip doubles and the required refresh rate halves every few years. The fact that DRAM access times do not double every few years results in a processor-DRAM speed mismatch. If the processor is to execute a program and manipulate data stored in a DRAM, it will have to insert wait states into its bus cycles to work with the slower DRAM. To combat this, hierarchical cache structures or large on-board SRAM banks are used so that on average, much less time is spent waiting for the large but slower DRAM.

Real-time multimedia capabilities are becoming increasingly important in microcomputer systems. Especially with video and image data, it is not practical to build caches large enough to hold the requisite data structures while they are being processed. This gives rise to large amounts of data traffic between the memory and the processor and decreases cache efficiency. For example, the Intel Pentium processors employ MMX technology, which essentially provides a vector processor subsystem that can process multiple pixels in parallel. However, even with faster synchronous DRAM, the problem remains that performance is limited by the DRAM access time needed to transfer data to and from the processor.

Other applications where external DRAM presents a system bottleneck are database applications. Database processing involves such algorithms as searching, sorting, and list processing in general. A key identifying requirement is the frequent use of memory indirect addressing. In memory indirect addressing, a pointer is stored in memory. The pointer must be retrieved from memory and then used to determine the address of another pointer located in memory. This addressing mode is used extensively in linked list searching and in dealing with recursive data structures such as trees and heaps. In these situations, cache performance diminishes as the processor is burdened with having to manipulate large data structures distributed across large areas in memory. In many cases, these memory accesses are interleaved with disk accesses, further reducing system performance.

Several prior art approaches have been used to increase processing speed in microsystems involving a fast processor and a slower DRAM. Many of these techniques, especially cache oriented solutions, are detailed in "Computer Architecture: A Quantitative Approach, 2nd Ed.," by John Hennessy and David Patterson (Morgan Kaufmann Publishers, 1996). This reference also discusses pipelined processing architectures together with instruction-level parallel processing techniques, as embodied in superscalar and VLIW architectures. These concepts are extended herein to provide improved performance by providing split caching and instruction-level parallel processing structures and methods that employ a CPU core and embedded DRAM logic.

The concept of using a coprocessor to extend a processor architecture is known in the art. Floating point coprocessors, such as the Intel 80×87 family, monitor the instruction stream from the memory into the processor, and, when certain coprocessor instructions are detected, the coprocessor latches and executes the coprocessor instructions. Upon completion, the coprocessor presents the results to the processor. In such systems, the processor is aware of the presence of the coprocessor, and the two work together to accelerate processing. However, the coprocessor is external from the memory, and no increase in effective memory bandwidth is realized. Rather, this solution speeds up computation by employing a faster arithmetic processor than could be integrated onto a single die at the time. Also, this solution does not provide for the important situation when the CPU involves a cache. In such situations, the coprocessor instructions cannot be intercepted, for example, when the CPU executes looped floating point code from cache. Another deficiency with this prior art is its inability to provide a solution for situations where the processor is not aware of the presence of the coprocessor. Such a situation becomes desirable in light of the present invention, whereby a standard DRAM may be replaced by an embedded DRAM to accelerate processing without modification of preexisting application software.

Motorola employed a different coprocessor interface for the MC68020 and MC68030 processors. In this protocol, when the processor executes a coprocessor instruction, a specialized sequence of bus cycles is initiated to pass the coprocessor instruction and any required operands across the coprocessor interface. If, for example, the coprocessor is a floating point processor, then the combination of the processor and the coprocessor appears as an extended processor with floating point capabilities. This interface serves as a good starting point, but does not define a protocol to fork execution threads or to jointly execute instructions on both sides of the interface. Furthermore, it does not define a protocol to allow the coprocessor to interact with the instruction sequence before it arrives at the processor. Moreover, the interface requires the processor to wait while a sequence of slow bus transactions are performed. This interface concept is not sufficient to support the features and required performance needed of the embedded DRAM coprocessors.

U.S. Pat. No. 5,485,624 discloses a coprocessor architecture for CPUs that are unaware of the presence of a coprocessor. In this architecture, the coprocessor monitors addresses generated by the CPU while fetching instructions, and when certain addresses are detected, interprets an opcode field not used by the CPU as a coprocessor instruction. In this system, the coprocessor then performs DMA transfers between memory and an interface card. This system does not involve an embedded DRAM that can speed processing by minimizing the bottleneck between the CPU and DRAM. Moreover, the coprocessor interface is designed to monitor the address bus and to respond only to specific preprogrammed addresses. When one of these addresses is identified, then an unused portion of an opcode is needed in which to insert coprocessor instructions. This system is thus not suited to systems that use large numbers of coprocessor instructions as in the split processor architecture of the present invention. A very large content addressable memory (CAM) would be required to handle all the coprocessor instruction addresses, and this CAM would need to be flushed and loaded on each task switch. The need for a large CAM eliminates the DRAM area advantage associated with an embedded DRAM solution. Moreover, introduction of a large task switching overhead eliminates the acceleration advantages. Finally, this technique involves a CPU unaware of the coprocessor but having opcodes that include unused fields that can be used by the coprocessor. A more powerful and general solution is needed.

The concept of memory based processors is also known in the art. The term "intelligent memories" is often used to describe such systems. For example, U.S. Pat. No. 5,396,641 discloses a memory based processor that is designed increase processor-memory bandwidth. In this system, a set of bit serial processor elements function as a single instruction, multiple data (SIMD) parallel machine. Data is accessed in the memory based processor using normal row address and column address strobe oriented bus protocols. SIMD instructions are additionally latched in along with row addresses to control the operation of the SIMD machine under control by a host CPU. Hence, the description in U.S. Pat. No. 5,396,641 views the intelligent memory as a separate parallel processor controlled via write operations from the CPU. While this system may be useful as an attached vector processor, it does not serve to accelerate the normal software executed on a host processor. This architecture requires the CPU to execute instructions to explicitly control and route data to and from the memory based coprocessor. This architecture does not provide a tightly coupled acceleration unit that can accelerate performance with specialized instruction set extensions, and it cannot be used to accelerate existing applications software unaware of the existence of the embedded DRAM coprocessor. This architecture requires a very specialized form of programming where SIMD parallelism is expressly identified and coded into the application program.

It would be desirable to have an architecture that could accelerate the manipulation of data stored in a slower DRAM. It would also be desirable to be able to program such a system in a high level language programming model whereby the acceleration means are transparent to the programmer. It would also be desirable to maintain the processing features and capabilities of current microprocessors, to include caching systems, instruction pipelining, superscalar or VLIW operation, and the like. It would also be desirable to have a general purpose processor core that could implement operating system and applications programs so that this core could be mixed with different embedded DRAM coprocessors to accelerate the memory intensive processing of, for example, digital signal processing, multimedia or database algorithms. Finally, it would be desirable if a standard DRAM module could be replaced by an embedded DRAM module with processor architectural extensions, whereby existing software would be accelerated by the embedded DRAM extension.

SUMMARY OF THE INVENTION

One aspect of the present invention is a processor whose architecture is partitioned into a CPU core portion and an embedded DRAM portion. The CPU core portion handles the main processing and control functions, while the embedded DRAM portion performs memory-intensive data manipulations. In the architecture, instructions execute either on the CPU core portion of the processor, the embedded DRAM portion of the processor, or across both portions of the processor.

In another aspect of the present invention, the CPU portion is able to effectively cache instructions and data while still sharing the instruction stream with the embedded DRAM portion of the processor implemented in the embedded DRAM. A separate caching structure is employed for a different program space on the embedded DRAM. Using this system, the separation of the CPU and embedded DRAM portions of the architecture is transparent to the programmer, allowing standard high level language software to run. In one embodiment, a special compiler is used to segment the code into a plurality of instruction types. The processor architecture takes advantage of the embedded DRAM, advantageously employing multiple address spaces that are transparent to the first portion of the processor, and that minimize data bussing traffic between the processors.

Another aspect of the present invention is an apparatus and method to execute standard available software on a split architecture. For example, in the personal computer and workstation markets there are already multi-billion dollar investments in preexisting software. In this aspect of the invention, an embedded DRAM module may be inserted into an existing single in line memory module (SIMM) slot. Thus, an accelerator may be added without needing to modify existing application software, and the upgrade can be performed effortlessly in the field. This functionality is enabled by allowing the embedded DRAM coprocessor to monitor the instruction stream and to replace certain instruction sequences with read and write commands. In one embodiment a profiler analyzes uniprocessor execution either statistically or dynamically and then constructs modification tables to reassign certain code segments to the embedded DRAM coprocessor. In another embodiment, the embedded DRAM performs the analysis in real-time. In still another embodiment, the embedded DRAM is exercised by standard software through the use of preloaded driver programs accessed via operating system calls.

Another aspect of the present invention is a computer system which comprises a central processing unit and an external memory coupled to the central processor. The external memory comprises one or more dynamic random access memory (DRAM) arrays, a set of local functional units, a local program prefetch unit, and a monitor/modify unit. The monitor/modify unit is operative to evaluate each instruction opcode as it is fetched from the DRAM array, and, in response to the opcode, to perform one of the following actions:

(i) sending the opcode to the central processing unit;

(ii) sending the opcode to the set of local functional units; and (iii) sending the opcode to the local program prefetch unit to fork a separate execution thread for execution by the set of local functional units.

Preferably, in response to the opcode, the monitor/modify unit also performs the actions of sending the opcode to the set of local functional units, substituting at least one different opcode for the opcode, and sending the at least one different opcode to the central processing unit. Also preferably, the at least one different opcode instructs the central processing unit to read values from the external memory representative of the register contents that would have been present in the central processing unit had the central processing unit executed the original instruction stream.

Another aspect of the present invention is an embedded dynamic random access memory (DRAM) coprocessor designed to be coupled to a central processing unit. The embedded DRAM coprocessor comprises one or more DRAM arrays. An external memory interface is responsive to address and control signals generated from an external source to transfer data between the DRAM arrays and the external source. A set of local functional units execute program instructions. A local program prefetch unit fetches program instructions. A monitor/modify unit evaluates each instruction opcode as it is fetched under control of the external source from the DRAM array, and, in response to the opcode, performs one of the following actions:

(i) sending the opcode to the external source;
(ii) sending the opcode to the set of local functional units; and
(iii) sending the opcode to the local program prefetch unit to fork a separate execution thread for execution by the set of local functional units.

Preferably, in response to the opcode, the monitor/modify unit also performs the actions of sending the opcode to the set of local functional units, substituting one or more different opcodes for the opcode, and sending the one or more different opcodes to the external source.

Another aspect of the present invention is a computer system which comprises a central processing unit coupled to an external memory. The central processor unit comprises a first set of functional units responsive to program instructions. A first program cache memory has at least one level of caching and provides high speed access to the program instructions. A first prefetch unit controls the fetching of a sequence of instructions to be executed by the first set of functional units. The instructions are fetched from the external memory unless the program instructions are found in the first program cache memory; in which case, the program instructions are fetched from the first program cache memory. The external memory comprises one or more dynamic random access memory (DRAM) arrays, a second set of local functional units, a second program prefetch unit, and a second program cache memory. The first program cache memory only caches instructions executed by the functional units on the central processing unit, and the second program cache memory only caches instructions executed by the second set of functional units on the external memory device. Preferably, the first program cache memory is a unified cache which also serves as a data cache. Also preferably, the central processing unit sends one or more attribute signals to identify certain memory read signals to be instruction fetch cycles. The attribute signals are decoded by logic embedded in the external memory so that the second program cache memory can identify opcode fetch cycles. In particular embodiments, the external memory further includes a monitor/modify unit which intercepts opcodes fetched by the first prefetch unit and passes the opcodes to the second prefetch unit to cause the second prefetch unit to fetch a sequence of program instructions for execution. The opcodes of the sequence of program instructions are fetched from the one or more DRAM arrays unless they are found to reside in the second program cache.

Another aspect of the present invention is an embedded dynamic random access memory (DRAM) coprocessor which comprises an external memory interface for transferring instructions and data in response to address and control signals received from an external bus master. The coprocessor also comprises one or more DRAM arrays, a set of local functional units, a program prefetch unit, and a program cache memory. The program cache memory only caches instructions executed by the functional units on the external memory device. Preferably, the external memory interface receives one or more attribute signals to identify certain memory read signals to be instruction fetch cycles. The attribute signals are decoded by logic embedded in the external memory so that the program cache can identify externally generated opcode fetch cycles. The coprocessor preferably includes a monitor/modify unit which intercepts opcodes in instructions transferred over the external memory interface and which passes the opcodes to the program prefetch unit to cause the program prefetch unit to fetch a sequence of program instructions for execution. The opcodes of the sequence of program instructions are fetched from the one or more DRAM arrays unless the opcodes of the sequence of program instructions are found to reside in the program cache.

Another aspect of the present invention is a computer system which comprises a central processing unit coupled to an external memory. The central processing unit comprises a first set of functional units responsive to program instructions. A first prefetch unit controls the fetching of a sequence of instructions from the external memory to be executed by the first set of functional units. The external memory comprises one or more dynamic random access memory (DRAM) arrays, a second set of local functional units, one or more external interface busses, and a second program prefetch unit. The central processing unit and the external program memory jointly execute a single program which is segmented into first and second program spaces. The first program space comprises type I, type II and optionally type III instructions. The second program space comprises type II and type III instructions. The type I instructions always execute on the first set of functional units. The type II instructions generate interface control exchanges between the central processing unit and the external memory. The type II instructions selectively are split into portions executed on the central processing unit and portions executed on the external memory. The type III instructions always execute on the second set of functional units. Preferably, the central processing unit has a first program cache, and the external memory has a second program cache. The first cache only caches the type I and the type II instructions accessed in the first program space. The second program cache only caches type II and type III instructions accessed in the second program space. Preferably, upon the execution of the type II instruction on the central processing unit, a logical address is transferred over one of the external interface busses to the external memory. The external memory passes the logical address to the second prefetch unit, which, in turn, fetches a sequence of instructions from the second program space. The sequence of instructions is executed by a second set of functional units in the external memory. Preferably, the type II instructions comprise first and second opcodes. The first opcode executes on the central processing unit, and the second opcode executes on the external memory. The first opcode comprises instruction type identifier information, opcode information to direct execution of a one of the first set of functional units, and an address field to be transferred over one of the external interface busses to reference instructions in the second program space. The second opcode comprises instruction type identifier information and opcode information to direct execution of a one of the second set of functional units. Preferably, the second opcode further comprises signaling information to be passed across one of the external interface busses to the central processing unit. A stop field indicates to the second prefetch unit to stop fetching instructions from the second program space. Preferably, the type II instruction is a split branch to subroutine instruction, and upon execution of the split branch to subroutine instruction, a subroutine branch address is passed across one of the external interface busses to activate a subroutine stored in the second program space. Preferably, the type II instruction involves a first operand stored in memory and a second operand stored in a register located on the central processing unit. The type II instruction is split into a first portion and a second portion. The first portion executes on the external memory to access the first operand and to place it on one of the external interface busses. The second portion executes on the central processing unit which reads the first operand from one of the external interface busses and computes a result of the type II instruction.

Another aspect of the present invention is an embedded dynamic random access memory (DRAM) coprocessor which jointly executes a program with an external central processing unit. The embedded DRAM coprocessor comprises a DRAM array which comprises one or more DRAM banks. Each bank has an associated row pointer. Each row pointer is operative to precharge and activate a row in the respective DRAM bank. A first synchronous external memory interface accepts address and control information used to access memory locations in the DRAM array. A second synchronous external memory interface receives type II instruction information from an external source. A prefetch unit is responsive to the received type II information to execute one or more instructions referenced by the received type II information. A set of one or more functional units is responsive to instructions fetched by the prefetch unit. Preferably, the first and the second synchronous interfaces share a common bus. Also preferably, the embedded DRAM coprocessor further comprises a program cache which caches program instructions fetched under the control of the prefetch unit from the DRAM array. The embedded DRAM coprocessor may also further comprise a register file coupled to the DRAM array and to the functional units, wherein at least a subset of the register file contains a mirror image of a register set contained on the external central processing unit. In certain embodiments, at least a subset of the set of one or more functional units includes a replica of at least one functional unit contained on the external central processing unit. In preferred embodiments, the register file may further include a set of multimedia extension (MMX) registers, and the at least one functional unit may include at least one MMX functional unit.

Another aspect of the present invention is a computer system which comprises a central processing unit which includes at least one level of program cache memory. An embedded dynamic random access memory (DRAM) coprocessor is coupled to the central processing unit. The embedded DRAM coprocessor comprises a DRAM array which comprises one or more DRAM banks, each with an associated row pointer. The row pointer precharges and activates a row in the DRAM bank. A first synchronous external memory interface accepts address and control information used to access memory locations in the DRAM array. A second synchronous external memory interface receives from the central processing unit addresses into the second program space. A prefetch unit is responsive to the received addresses and prefetches one or more instructions referenced by the received addresses. A set of one or more functional units is responsive to instructions fetched by the prefetch unit. When the central processor executes specified instructions in an instruction stream read from a first program memory space in the embedded DRAM coprocessor, the central processor sends address information to the embedded DRAM coprocessor which references instructions in a second program memory space located in the embedded DRAM coprocessor. As a result, the central processing unit and the embedded DRAM coprocessor jointly execute a program. Preferably, the embedded DRAM coprocessor further includes a register file coupled to the DRAM array and the functional units. At least a subset of the register file contains a mirror image of a register set contained on the external central processing unit. At least a subset of the set of the one or more functional units is capable of executing a subset of the instruction set executed on the central processing unit. Also preferably, the register file further includes a set of multimedia extension (MX) registers., and the functional units include one or more MMX functional units.

Another aspect of the present invention is a central processing unit cooperative to jointly execute programs fetched from an embedded dynamic random access memory (DRAM) coprocessor. The central processing unit comprises a prefetch unit which fetches instructions to be executed by the central processing unit, set of internal registers, a set of one or more functional units which executes instructions, an optional program cache, a first external memory interface which transfers addresses, control signals and data to and from external memory and input/output (I/O) devices, and a second external memory interface which transfers synchronization signals and address information between the central processing unit and the embedded DRAM coprocessor. The central processing unit and the embedded DRAM coprocessor jointly execute a single program that is partitioned into first and second memory spaces. The instructions in the first memory space are executed by the central processing unit. The instructions in the second memory space are executed by the embedded DRAM coprocessor. The instructions in the first memory space include a first type of instruction and a second type of instruction. The first type of instruction is executed wholly on the central processing unit. Upon execution, the second type of instruction sends address information which references instructions in the second program space to the embedded DRAM coprocessor. Upon execution of the second type of instruction, the central processing unit directs the embedded DRAM coprocessor to perform at least one of the following operations:

(i) fork a separate execution thread to execute a sequence of instructions stored in the second program space;

(ii) execute a fixed number of instructions and then stop; and (iii) execute a fixed number of instructions and supply one or more results over one of the first external memory interface and the second external memory interface in alignment with a clock edge, a fixed number of clock cycles later.

Another aspect of the present invention is a central processing unit cooperative to jointly execute programs fetched from an embedded dynamic random access memory (DRAM) coprocessor. The central processing unit comprises a prefetch unit operative to fetch instructions to be executed by the central processing unit, a set of internal registers, a set of one or more functional units operative to execute instructions, a program cache, a first external memory interface operative to transfer addresses, control signals, and data to and from external memory and input/output (I/O) devices, and a second external memory interface operative to transfer synchronization signals and optionally address information between the central processing unit and the embedded DRAM coprocessor. The central processing unit and the embedded DRAM coprocessor jointly execute a single program which is partitioned into first and second memory spaces. The instructions in the first memory space are executed by the central processing unit, and the instructions in the second memory space are executed by the embedded DRAM coprocessor. The instructions in the first memory space include a first type of instruction which is executed wholly on the central processing unit and a second type of instruction which, upon execution, sends address information which references instructions in the second program space to the embedded DRAM coprocessor. The central processor unit and the embedded DRAM coprocessor have overlapping architectures which include mirror image subsets of registers and mirror image subsets of functionality of the functional units. The central processing unit and the embedded DRAM coprocessor execute an overlapping instruction set.

Another aspect of the present invention is a method to jointly execute programs on a central processing unit coupled to an embedded dynamic random access memory (DRAM) coprocessor. The method comprises the steps of replicating a portion of a register set of the central processing unit on the embedded DRAM coprocessor, and replicating a portion of the functionality of functional units of the central processing unit to support the replicating of a portion of the instruction set of the central processing unit on the embedded DRAM coprocessor. A program is jointly executed on the central processing unit and the embedded DRAM coprocessor by partitioning computationally intensive portions of the code to run on the central processing unit and by partitioning memory intensive code segments to run on the embedded DRAM coprocessor. The contents of selected ones of the replicated register subsets are transferred between the central processing unit and the embedded DRAM coprocessor in order to maintain program level synchronization between the central processing unit and the embedded DRAM coprocessor. Preferably, the method further includes the step of adding an architectural extension on the embedded DRAM coprocessor. The architectural extension comprises an additional set of registers beyond those contained on the central processing unit. The architectural extension also comprises additional instructions beyond those processed by the central processing unit. The method also preferably includes the step of partitioning code segments which reference the additional registers and code segments which use the additional instructions to be executed on the embedded DRAM coprocessor.

Another aspect of the present invention is a split very long instruction word (VLIW) processing apparatus which comprises a VLIW central processor. The VLIW central processor comprises a set of functional units which receive a plurality of instructions for execution in parallel and a first VLIW program cache which holds a collection of very long instruction words. Each very long instruction word comprises a set of instruction fields. Each instruction field comprises an instruction to be executed by a functional unit. The central processor further includes a dispatch unit which scans bit fields within the instruction fields to decide how many instructions to dispatch in parallel and to which functional unit to direct each instruction. One or more register files are coupled to the functional units. An external memory interface carries instructions and data from an external source. An on-board data memory is coupled to the functional units, the register files, and the external memory interface. At least one of the functional units includes a branch processing unit which processes branch instructions. The branch processing unit is coupled to a prefetch unit used to sequence the VLIW control words from the VLIW program cache or external memory. The branch processing unit is also coupled to an external interface for transferring branch related information. The processing apparatus also includes a VLIW extension processor which cooperates with the VLIW central processor to jointly execute a single VLIW program. The VLIW extension processor comprises a set of at least one functional unit which receives one or more instructions for execution in a given clock cycle. A second VLIW program cache holds a collection of very long instruction words, whereby each very long instruction word comprises one or more instruction fields, wherein each instruction field comprises an instruction to be executed by a functional unit. A second dispatch unit scans bit fields within the instruction fields to decide how many instructions to dispatch in parallel and to which functional unit to direct each instruction. At least one of the functional units includes a second branch processing unit which processes branch instructions. The branch processing unit is coupled to a prefetch unit which sequences VLIW control words from the second VLIW program cache. The branch processing unit is also coupled to a second external interface which transfers branch related information. Preferably, the VLIW processing apparatus further includes an on-board dynamic random access memory (DRAM) coupled to the functional units. The on-board DRAM is coupled to an externally controllable synchronous memory interface. Also preferably, the DRAM is buffered via one of an active row sense amp techniques, an SRAM cache, or a data register file. Also preferably, the first and second branch processing units simultaneously execute control dependent branches, as encountered in looping, without transferring branch related information across the second external interface. Preferably, only one of the first and second branch processing units simultaneously executes data dependent branches, and the branch target address is passed to or from the central VLIW from or to the VLIW extension processor. Preferably, the number of the data dependent branches requiring synchronization is minimized using conditional execution of instructions on the central VLIW processor and the VLIW extension processor. Preferably, the first and second prefetch units fetch a single very long instruction word which comprises a first portion stored in the first VLIW program cache which controls the first prefetch unit and a second portion stored in the second VLIW program cache which controls the second prefetch unit. Information encoded into the first portion of the very long instruction word indicates whether the first prefetch unit is to dispatch a set of instructions each clock cycle or to insert delays between the dispatching of certain groups of instructions. Information encoded into the second portion of the very long instruction word indicates whether the second prefetch unit is to dispatch a set of instructions each clock cycle or to insert delays between the dispatching of certain groups of instructions. The first and second prefetch units operate together in response to the first and second portions of the very long instruction word so as synchronize the dispatching of instructions in the central VLIW processor and the extension VLIW processor. This conserves program memory space when the processing loads of the VLIW central processor and the VLIW extension processor are uneven. Also preferably, the first branch processing unit sends a fork branch address to the second branch processing unit. The second branch processing unit responds to the fork branch address by forking an execution thread to a specified address. As a result, the central VLIW processor and the VLIW extension processor execute separate instruction sequences in a decoupled manner. Upon completion of the separate instruction sequences, the first and second branch processing units resynchronize by executing join instructions which cause the central VLIW processor and the extension VLIW processor to cease fetching instructions from a specified address until a synchronization signal has been received over the second external interface. Preferably, the processing apparatus also includes a sequential access memory interface to the DRAM array so that the VLIW extension processor can directly control a frame buffer.

Another aspect of the present invention is a method to accelerate application programs written without knowledge of an embedded dynamic random access memory (DRAM) coprocessor. The application programs are written to execute on a central processing unit. The method comprises the step of implementing a set of operating system level application program interface routines (APIs) called by the application program and the step of writing the APIs to implement a specified functionality of the APIs by executing a first portion of a driver program on the central processing unit and by executing a second portion of the driver program on the embedded DRAM coprocessor. The driver program further executes instructions which generate interface transactions between the central processor unit and the embedded DRAM coprocessor. Preferably, the method includes the step of evaluating specified ones of calls to the APIs and the step of determining whether to generate an operating system message or to call the driver routine directly to bypass the normally associated operating system message delay.

Another aspect of the present invention is a method to accelerate application programs written without knowledge of an embedded dynamic random access memory (DRAM) coprocessor, wherein the application programs are written to execute on a central processing unit having a level one (L1) cache and having a level two (L2) cache. The method comprises the step of executing an execution profiler routine which monitors system parameters such as memory waiting time, loop indices, and cache miss rate, and the step of identifying program segments which generate specified memory traffic patterns which generate excessive numbers of L1 or L2 cache misses. The method includes the further step of constructing a modification table to reallocate the identified program segments to execute in the embedded DRAM coprocessor. The modification table includes at least references to instructions used to communicate parameters and results between the central processor unit and the embedded DRAM coprocessor. The method further includes the step of loading the program to run with a loader program. The loader program also evaluates the modification tables in order to insert communication instructions where needed, to load instructions to be executed by the central processing unit into a first program space, and to load instructions to be executed by the embedded DRAM coprocessor into a second program space. Preferably, the execution profiler further comprises a first communicating component which runs on the central processing unit and which monitors processor and L1 cache performance. A second communicating component runs on the embedded DRAM coprocessor and monitors DRAM traffic. Also preferably, the second communicating component further monitors the L2 cache miss rate.

Another aspect of the present invention is a method to accelerate application programs written without knowledge of an embedded dynamic random access memory (DRAM) coprocessor, wherein the application programs are written to execute on a central processing unit. The method comprises the step of parsing a machine code program with a translator program knowledgeable of the machine language. The translator identifies program segments which contain specific opcode types and identifies program segments which contain loop constructs whose loop counters are initialized with numbers beyond prespecified thresholds. The method also includes the step of constructing a modification table to reallocate the identified program segments to execute in the embedded DRAM coprocessor. The modification table includes at least references to instructions used to communicate parameters and results between the central processor unit and the embedded DRAM coprocessor. The method also includes the step of loading the program to run with a loader program. The loader program also evaluates the modification tables in order to insert the parameter and result communication instructions where needed, to load instructions to be executed by the central processing unit into a first program space, and to load instructions to be executed by the embedded DRAM coprocessor into a second program space. Preferably, the program segment boundaries are aligned with subroutine call and return instructions. Also preferably, the specific opcode types are multimedia extension (MMX) instructions. Preferably, at least one of the specific opcode types is not executable on the central processor unit, but is executable on the embedded DRAM coprocessor. At least one of specific opcode types may be a multimedia extension (MMX) instruction.

Another aspect of the present invention is an embedded dynamic random access memory (DRAM) coprocessor implemented as individual bit slice units which are equipped with standard single in-line memory module (SIMM) interface connectors so they can be interchanged with standard DRAM SIMMs found on computer boards in personal computers, workstations, and other forms of electronic equipment. Preferably, the coprocessor further comprises an additional interface connector which connects the embedded DRAM bit slice processors, together via a separate backplane not found on the computer board into which the embedded DRAM coprocessors are plugged. Also preferably, the bit slice width of the SIMM is equal to the bus word width of the processor to which the memory modules are attached.

Another aspect of the present invention is a processing architecture which includes a first CPU core portion coupled to a second embedded dynamic random access memory (DRAM) portion. These architectural components jointly implement a single processor and instruction set. Advantageously, the embedded logic on the DRAM chip implements the memory intensive processing tasks, thus reducing the amount of traffic that needs to be bussed back and forth between the CPU core and the embedded DRAM chips. The embedded DRAM logic monitors and manipulates the instruction stream into the CPU core. The architecture of the instruction set, data paths, addressing, control, caching, and interfaces are developed to allow the system to operate using a standard programming model. Specialized video and graphics processing systems are developed. Also, an extended very long instruction word (VLIW) architecture implemented as a primary VLIW processor coupled to an embedded DRAM VLIW extension processor efficiently deals with memory intensive tasks. In different embodiments, standard software can be accelerated either with or without the express knowledge of the processor.

BRIEF DESCRIPTION OF THE DRAWINGS

The various novel features of the invention are illustrated in the figures listed below and described in the detailed description which follows.

DETAILED DESCRIPTION OF THE PREFERRED EMBODIMENT

Figure 1:
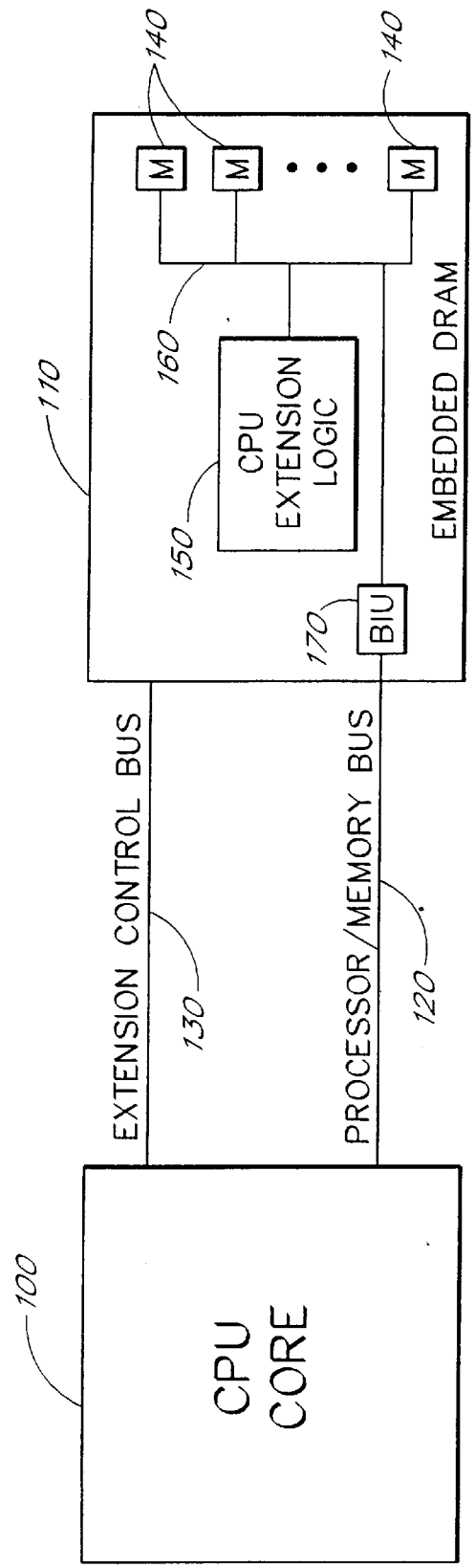
FIG. 1 is a high level block diagram of an embodiment of a split architecture comprising a CPU and an embedded DRAM extension.

FIG. 1 is a high level block diagram of an embodiment of a split architecture comprising a CPU 100 with an embedded DRAM extension 110 according to the present invention. The CPU 100 is coupled to the embedded DRAM 110 via a standard memory bus connection 120 and an optional extension control bus 130. The embedded DRAM 110 includes a DRAM memory array 140 which is coupled to an embedded logic CPU extension 150 via an internal bussing structure 160. Data transfers between internal bus 160 and external bus 120 are bidirectionally buffered and optionally queued by bus interface unit (BIU) 170. External transactions over the bus 120 are controlled via external control signals generated by the CPU 100 or via internal control signals generated by the CPU extension 150. In this system, the memory interface bus 120 carries address and control information to and possibly from the memory, and carries data back and forth between the CPU 100 and the embedded DRAM 110. The memory interface 120 may be implemented using available multiplexed or non-multiplexed DRAM bus interfacing techniques, such as, for example, those implemented on synchronous DRAMs (SDRAMs), synchronous burst DRAMs (SBDRAMs), cache DRAMs (CDRAMs), or Rambus DRAMs (RDRAMs). The optional extension control bus 130 is added in some embodiments to carry auxiliary address and/or control information generated to enable the CPU 100 and the embedded DRAM 110 to work together to execute a single instruction stream. The specific signaling used by the extension bus 130 or carried over the standard memory interface bus 120 will be discussed subsequently with respect to various embodiments.

Figure 2:
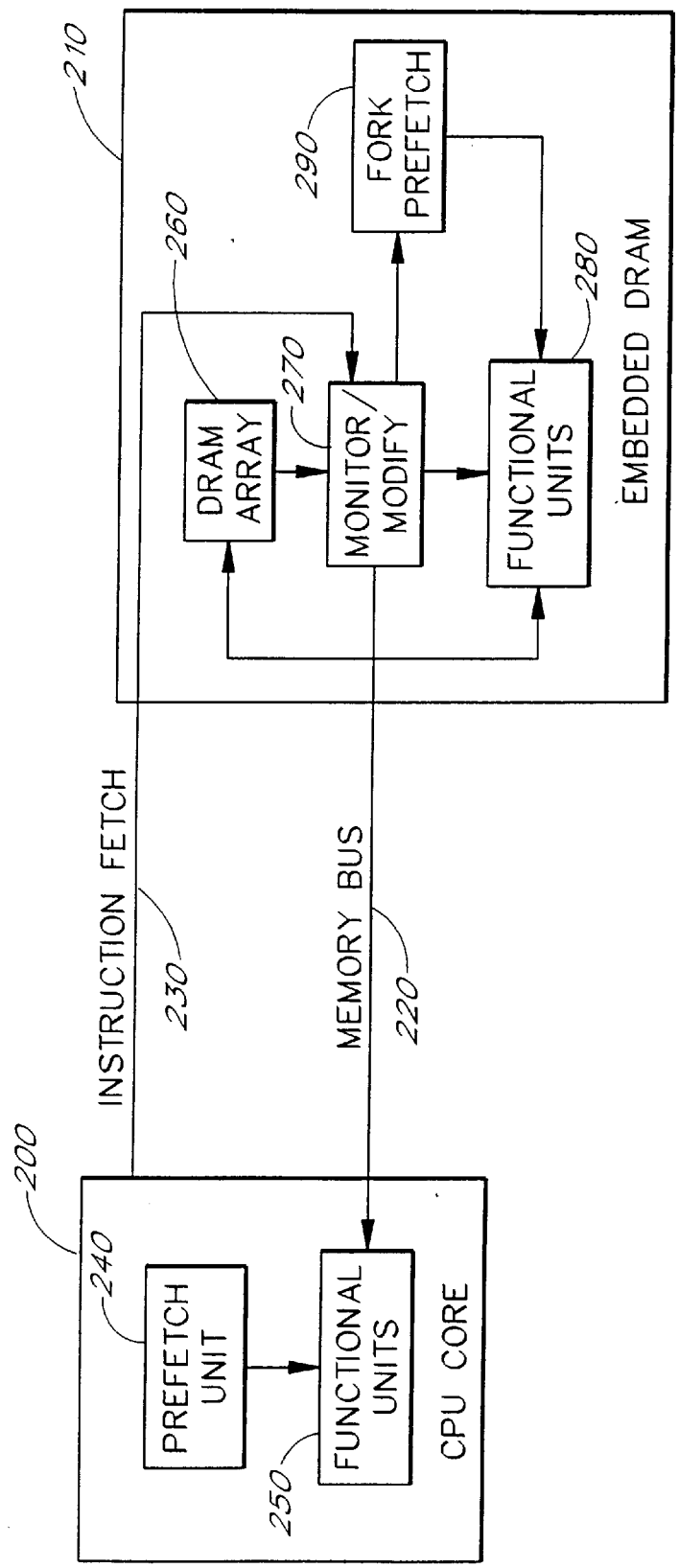
FIG. 2 is a block diagram of an embodiment of a split architecture system designed for use without a cache.

FIG. 2 is a block diagram of an embodiment of the architecture of the present invention in a system that does not incorporate a cache. A CPU core 200, including a prefetch unit 240 and one or more functional units 250, is connected via a memory interface bus 220 that carries instructions and data to and from embedded DRAM 210. Optionally, the CPU core 200 also includes an auxiliary signaling channel 230, for example, to identify certain read requests to be instruction fetches. The embedded DRAM 210 includes a DRAM array 260 preferably implemented with a pipelined, multibank, wide-bus, synchronous architecture. Instructions fetched from the DRAM array 260 are evaluated and possibly cached in a monitor/modify unit 270. The monitor/modify unit 270 passes selected instructions to a set of one or more embedded functional units 280 for execution. The monitor/modify unit 270 can optionally pass the instructions to a fork prefetch unit 290 and can also optionally modify the instruction stream passes over the bus 220 to the CPU core 100.

The CPU core 200 is operative to fetch and execute a program. This gives rise to an instruction stream that originates in the DRAM array 260, passes through the monitor/modify unit 270, and then passes over the bus 220 into the functional units 250 of the CPU core 200. When a memory read cycle is initiated to service an instruction fetch from the prefetch unit 240, a function code is output on the signaling channel 230 to signal the presence of an instruction fetch to an embedded DRAM 210. This tells the embedded DRAMs modify/monitor unit to evaluate the instruction and determine if the instruction should be executed by the functional units 280 on the embedded DRAM or by the functional units 250 on the CPU core. For example, a block of code involving memory oriented looping may be diverted from the CPU core 200 and passed to the embedded functional units 250. This code may be replaced with a set of load instructions that load the embedded processor's register state into the CPU core 200 to force the CPU core 200 to appear in the state it would be in if it had executed the loops itself. This allows the software to be accelerated without the processor's express knowledge.

Figure 3:
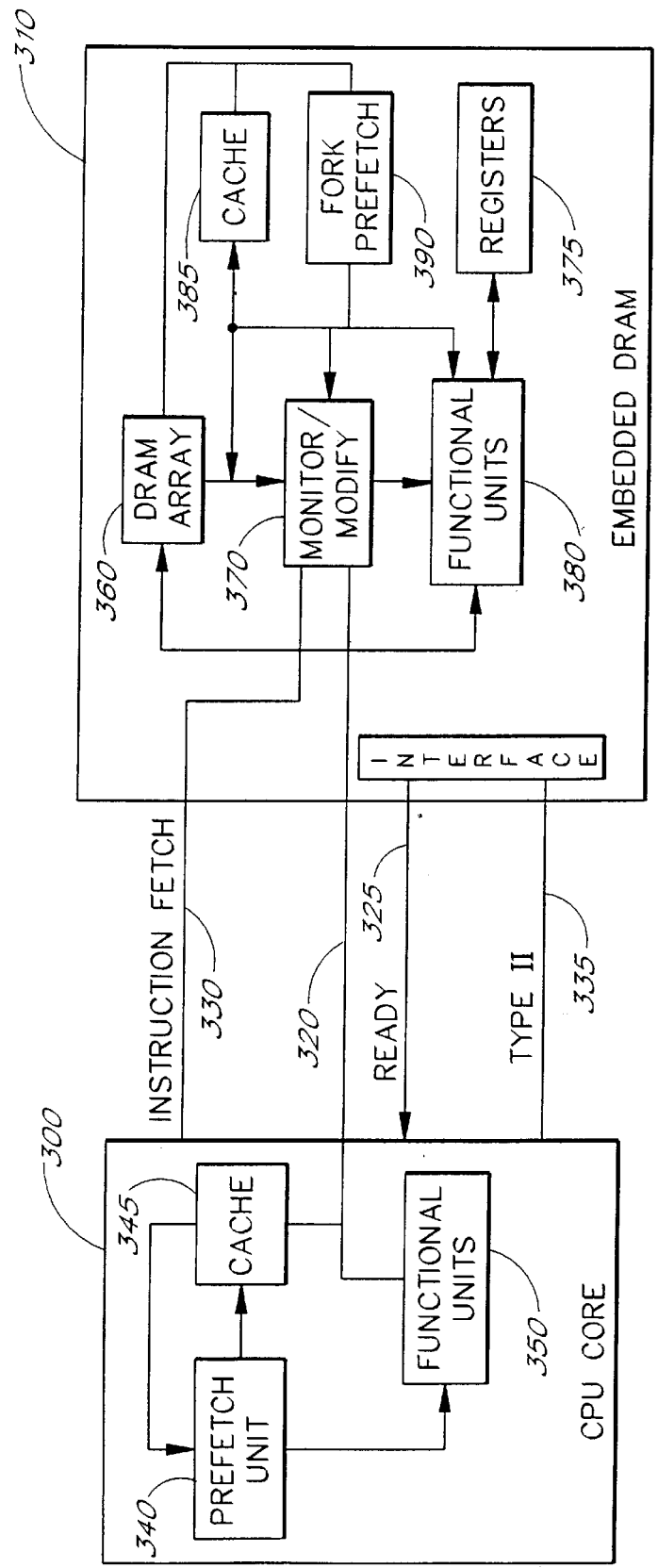
FIG. 3 is a block diagram of an embodiment of a split architecture system designed for use with a cache.

FIG. 3 illustrates an embodiment of the present invention that employs a split cache architecture. In this embodiment, it is assumed the CPU and the embedded DRAM are designed together and both have full knowledge of the presence of the other. As will be discussed, modifications to this architecture allow systems where the processor is unaware of the presence of the embedded DRAM accelerator. In FIG. 3, a CPU core 300 includes a prefetch unit 340 which controls the fetching of instructions to be executed by one or more functional units 350. A cache memory 345 is used to store instructions and/or data recently fetched into the CPU core 300. The cache 345 services cache hits and cache misses in the conventional manner. The instruction stream can flow into the functional units 350 via an external memory bus 320 or from the cache memory 345. The CPU core 300 accepts data and instructions over the memory bus 320 from an embedded DRAM 310. The embedded DRAM 310 includes a DRAM array 360 coupled to a monitor/modify unit 370. The monitor/modify unit 370 receives the instruction stream from the DRAM array 360 and is capable of directing instructions over the bus 320 to the CPU core 300 or to a set of one or more embedded functional units 380. In some embodiments, the monitor/modify unit 370 may be capable of diverting instructions originally intended for the CPU core 300 to the local functional units 380, and can reinsert new instructions to be delivered to the CPU core 300. Instructions received into the monitor/modify unit 370 that route to the local units 380 may be cached in a local cache memory 385. The cache memory 385 can supply instructions and data to the local functional units 380 in a conventional manner to reduce the effective DRAM access time as seen by the embedded DRAM logic. The cache memory 385 can be implemented as a program cache or as a unified program/data cache and can service cache hits and misses in the conventional manner. Also, the functional units may be coupled to registers 375 to reduce the number of required memory accesses. A fork prefetch unit 390 is responsive to commands routed thereto from the monitor/modify unit 370. The CPU core 300 and the embedded DRAM 310 are coupled via a set of busses. In addition to the principal memory bus 320, an optional ready line 325 signals from the embedded DRAM 310 to the CPU core 300 to indicate when results are available in the embedded DRAM 310. In some implementations, the ready signal will generate an interrupt to the processor core 300, in others it will be polled, and in still others it will be synchronized via the clock to the CPU core 300. In still other implementations, a status bit in a memory location may be polled by the CPU core over memory bus 320, eliminating the ready line all together. An optional instruction flow control bus 335 also couples the CPU core 300 to the embedded DRAM 310 to synchronize the embedded DRAM with a program executing out of cache 345. An instruction fetch line 330 couples the CPU core 300 and the embedded DRAM 310 to indicate when DRAM accesses correspond to instruction fetches.

In typical embodiments, a large percentage of the instructions executed by the CPU core 300 will be fetched from the local cache 345. As the program executes, certain instructions are executed by the CPU core 300, while other instructions are split to execute on both the CPU core 300 and the embedded DRAM 310, while others execute entirely on the embedded DRAM coprocessor 310. When a split instruction is fetched from the local cache 345, information regarding this instruction is sent from the CPU core 300 to the embedded DRAM 310 over instruction flow control bus 335. For example, if the program involves looping over an image to perform MMX instructions instead of transferring the data into the CPU, the looped MMX code can execute entirely in the embedded DRAM coprocessor. This functionality is enabled by the fork prefetch unit 390 which is operative to fork an execution thread in response to specified split instructions as will be subsequently discussed. The CPU core 300 simply executes a split-branch to subroutine instruction. Instead of branching to the subroutine, the CPU core 300 transfers the subroutine address and calling parameter information to the embedded DRAM coprocessor 310 over the bus 335 so that the embedded DRAM coprocessor can execute local code. To implement this technique, the compiler partitions the program between the CPU core 300 and the embedded DRAM coprocessor 310. When the compiler parses the high level language program, it analyzes loop structures that operate on array variables, and, by checking the loop boundaries, identifies index and pointer variables that reference large data structures. Based on an L1 cache model and possibly an L2 cache model, the compiler optimizes the code by partitioning those portions of code that manipulate large data structures to run on the embedded DRAM 310. This operation can be performed using standard compiler optimization techniques employed on vector processors. Techniques of loop fission, loop fusion, and loop unrolling, for example, represent known compiler optimizations that analyze loop structures to execute on a target architecture. These concepts are elaborated upon in the discussion of FIG. 7.

Figure 4:
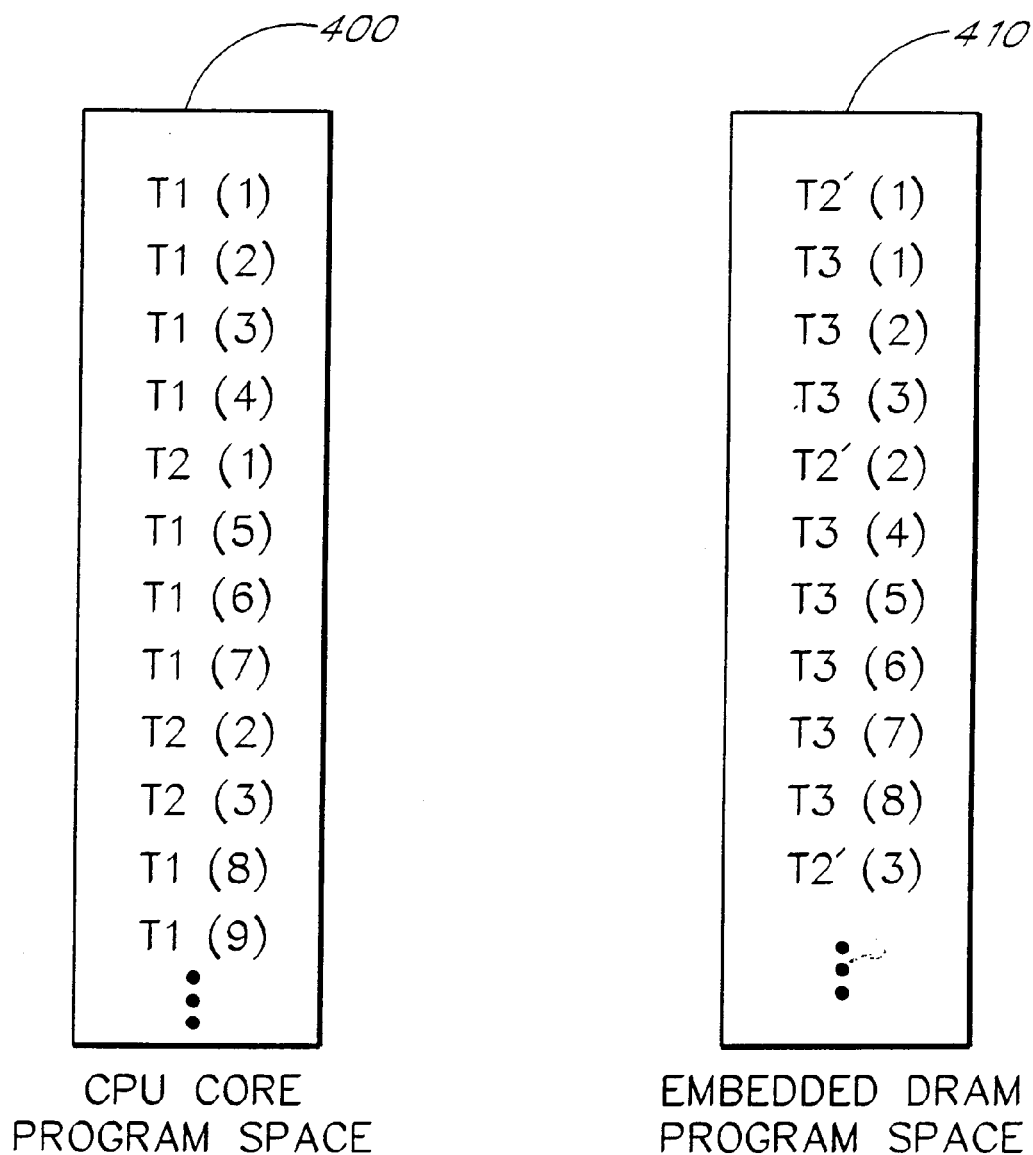
FIG. 4 illustrates the partitioning of a program space into two separate address spaces depending on instruction type.

FIG. 4 shows a partitioning of the program address space into two program spaces containing fixed instruction types. A CPU core program space 400 is used to store the main program. This is the program that will be fetched by the CPU core 300 from the embedded DRAM 310. Shown in the CPU core program space 400 are type I instructions, T1(i), and type II instructions, T2(j). Type I instructions execute wholly on the CPU core 300, while type II instructions involve interface signals between the CPU core 300 and the embedded DRAM 310. The type II instructions may involve two parts, one that executes on the CPU core 300, and another that executes in the embedded DRAM 310. In implementations involving the monitor/modify unit 370, the CPU core program space may contain type III instructions which are diverted to the embedded DRAM coprocessor 310. However, in systems involving a split cache structure, it is desirable to not include type III instructions in the CPU core program space 400. An embedded DRAM program space 410 includes type II instructions T2'(j), and type III instructions, T3(k). Here the i,j, and k values serve as indices for the type I, type II and type III instructions respectively. The T'(j) instructions represent the portion of the type II instructions executed on the embedded DRAM coprocessor 310 that correspond to associated type II instructions T(j) that execute on the CPU core 300. In some embodiments, the type I instructions and the type III instructions may overlap. That is, instructions may be defined that can execute on either the CPU core 300 or the embedded DRAM 310. If the instruction executes wholly on the CPU core 300, then it is a type I instruction. If the instruction executes wholly on the embedded-DRAM coprocessor 310, then it is a type III instruction. If the instruction involves communication between the processor core 300 and the embedded-DRAM coprocessor 310, and if it optionally is split into two sub-instructions, one sub-instruction executed by the CPU core 300, and the other sub-instruction executed by the embedded-DRAM coprocessor 310, then it is a type II instruction.

This CPU core program 400 is initially fetched by the CPU core 300 from the embedded DRAM 310 and is then cached in program cache 345 using conventional techniques. Whenever a type II instruction is executed on the CPU core 300, information preferably transfers over the bus 335 to the embedded DRAM coprocessor 310. The embedded DRAM coprocessor 310 receives the type II instruction field information which includes a logical address into the embedded DRAM program space 410. In response, the embedded DRAM coprocessor 310 executes the type II instruction referenced by the received logical address. At this point, the embedded DRAM coprocessor executes one or more instructions, depending on a field in the type II instruction coding in the embedded DRAM program space. The fork prefetch unit controls the instruction flow from the embedded DRAM program space 410.

An example of a type II instruction is a split branch to subroutine instruction. In this case, the CPU core executes a special type of subroutine branch instruction that causes the CPU core 300 to pass the subroutine address information over the interface 335. Subroutine call parameters may be sent by value or by reference over the interface 335 or the interface 320 into a buffer area in the embedded DRAM coprocessor 310. In response, the embedded DRAM 310 executes an associated type II instruction that is responsive to the received subroutine address to perform a branch. The subroutine will be implemented mainly using type III instructions which execute on the embedded DRAM 310. Upon completion, the return from subroutine instruction may be another type II instruction that signals completion back to the CPU core 300 which can thus synchronize to the completion event.

Another example of a type II instruction is the following command:

ADD 12([A0, A1*4]+$9000),D0

In this instruction, the first operand involves a memory indirect addressing mode. Once the effective address of this operand is identified, the instruction will cause the contents of the memory location referenced by the effective address to be added to register D0, and the result will be placed into register D0. Let M[x] denote the memory contents of address x. Also, let $y indicate that the number y is in hexadecimal format. Then the above effective address (ea) is calculated as follows:

ea=12+M[M[A0+A1*4]+$9000.

The operand needed for the addition is given by:

operand=M[12+M[M[A0+A1*4]+$9000].

The accessing of the first operand thus requires three memory accesses, a multiplication (left shift by two places) and two additions. All of this addressing is required to execute a simple addition of two operands. In an aspect of the present invention, the above instruction could be split into two type II instructions, one that executes on the CPU core 300, and another that executes on the embedded DRAM 310.

The portion that executes on the CPU core performs an instruction like

ADD $1000,D0 and the embedded DRAM performs an instruction like

MOVE 12([A0, A1*4]+$9000),$1000 where the location $1000 corresponds to a cache memory interface location located on the embedded DRAM 310. Several type III instructions may be executed to generate the operand. Preferably, the bus 325 can be used to control the transfer of the operand directly to CPU core 300 without the need for intermediate handshaking. That is, the CPU core 300 does not send out the address $1000, but reads the CPU bus 325 on an appropriate clock edge determined at compile time. Also, the compiler may issue a command early to allow the embedded-DRAM coprocessor 310 time to prepare an operand in advance so that the operand will be ready when it is needed in the instruction processing on the CPU core 300. That is, using the concepts of SDRAM technology, the data will become available a fixed delay later and will be synchronized with a clock edge. This allows the processor core 300 to continue with other instructions, for example using superscalar dispatching and out-of-order execution. The type II instruction will remain in the active buffer until its dependence information comes in, synchronized with the internal processor pipelines after a fixed delay.

Figure 5A:
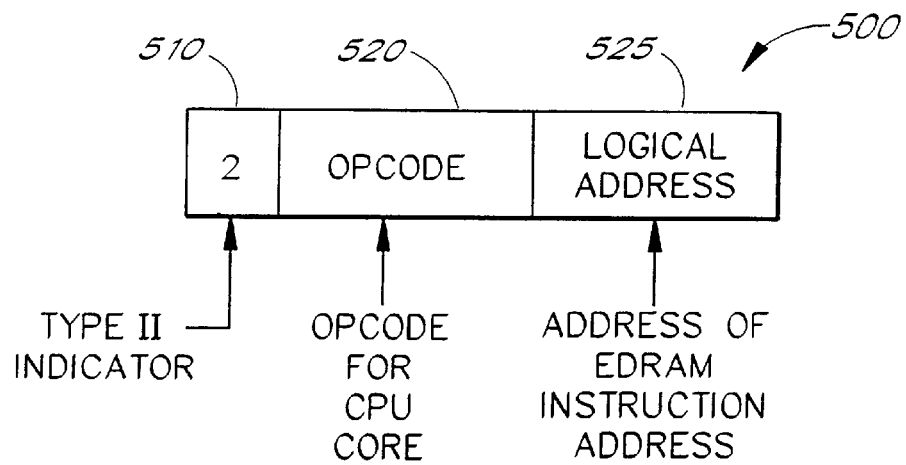
FIG. 5a illustrates type II instruction encoding as executed on the CPU core.
Figure 5B:
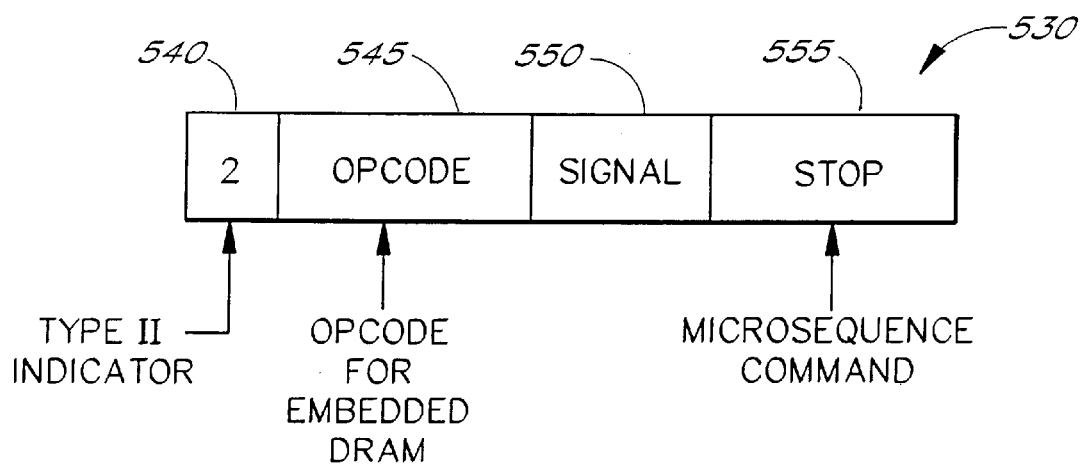
FIG. 5b illustrates type II instruction encoding as executed on the embedded DRAM coprocessor.

FIGS. 5a and 5b illustrate the instruction coding of the type II instructions. FIG. 5a illustrates a type II instruction 500 that executes on the CPU core 300. A first field 510 identifies the instruction type to be type II. A second field 520 includes an opcode to be executed by the CPU core 300. A third field 525 includes a logical address to be used to reference an associated type II instruction 530 (FIG. 5b) located in the embedded DRAM program space 410. In some embodiments, the opcode may contain extra parameter fields or words to be transmitted to the embedded-DRAM coprocessor 310. In still other embodiments, parameters may be sent using separate store-instructions. The associated type II instruction 530 located in the embedded DRAM program space 410 also has multiple fields. A first field 540 identifies the instruction to be of type II. A second field 545 specifies at least one opcode to be executed by one or more embedded. DRAM functional units. An optional third field 550 provides signaling information to control interface signals sent back to the CPU core 300. An optional fourth field 555 indicates whether or not to continue executing instructions. In some cases, when the type II instruction logical address field 525 is received over the interface 335 at the embedded DRAM 310, only a single instruction needs to be executed by the embedded DRAM coprocessor 310, while in other cases, a plurality of instructions may need to be executed in response to a single type II instruction. Hence, the field 555 is provided allow the embedded DRAM coprocessor 310 to either execute more instructions or to idle until a next type II instruction is received over the interface 335. This feature is optional and is provided to accelerate processing and to conserve code space and power. If such a field is not provided, a branch instruction can be inserted after the type II instruction. However this increases the code size, forces the processor to execute non-useful instructions, and requires time to execute.

Figure 6:
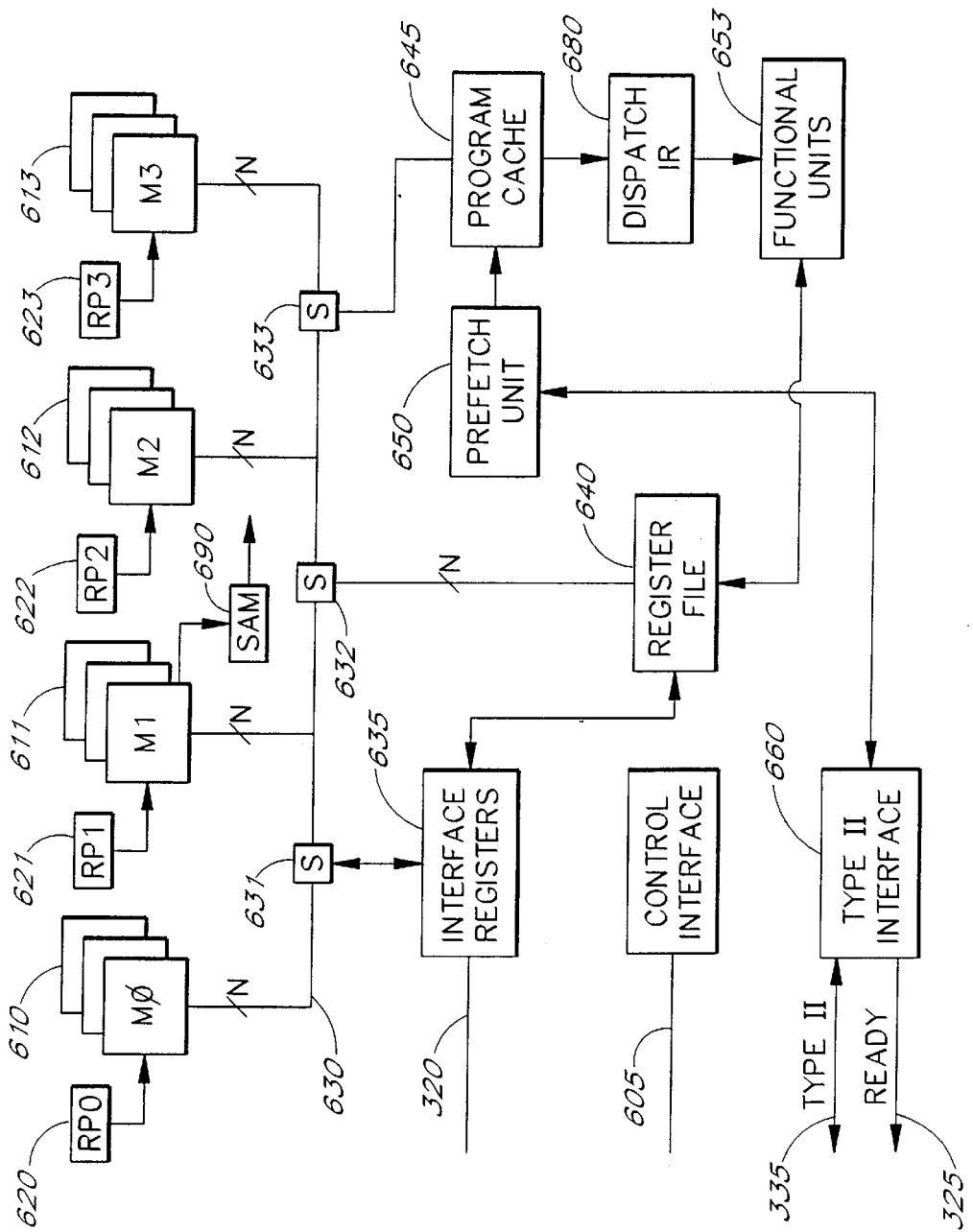
FIG. 6 illustrates an embodiment of the embedded DRAM coprocessor of the present invention.

FIG. 6 shows a preferred embodiment of the embedded DRAM coprocessor of the present invention. In the preferred embodiment, the embedded DRAM 600 appears to external hardware as an extended type of synchronous DRAM (SDRAM). That is, the embedded DRAM 600 accepts a clock and control inputs over a line 605 making up a standard SDRAM style interface. This interface may take various forms, for example, as found on commercial SDRAMs, SBRAMs, CDRAMs or RDRAMs, as are known in the art. In a preferred embodiment, the embedded DRAM 600 comprises four DRAM arrays 610, 611, 612, and 613. A respective row pointer 620, 621, 622, and 623 is associated with each of the DRAM arrays 610, 611, 612, and 613. The row pointers point to active rows in the DRAMs so that data in each column on an active row can be accessed without needing to precharge the row for each access as is well known in the art. When the a row in a DRAM is precharged such that data is readily accessible on the specified row, the activated row is said to be sense amp cached. The outputs of each DRAM 610, 611, 612, 613 lead to a switched bussing structure 630 below. Isolation switches 631, 632, and 633 allow different DRAM banks to be accessed concurrently so that data can be accessed in parallel to speed processing on the embedded DRAM. Additional speed can be obtained using wide data paths, for example N=64 or N=128 width busses may be employed to concurrently move multiple words out of the each DRAM array into fast buffer registers or cache. The switch 631 couples the busses connected to the memories M0 610 and M1 611 to an interface register set 635 used to buffer external data transfers. The interface register set 635 enables burst transfers on and off the chip. The switch 632 couples the busses connected to the memories M1 611 and M2 612 to an on-board register file 640. The switch 633 couples the busses connected to the memories M2 612 and M3 613 to an on-board program cache 645. In this embodiment, if the switches are set appropriately, data can transfer, for example, to or from the memory M3 613 from or to the interface registers 635 by coupling through the switches 631, 632 and 633. Other embodiments may employ different interconnection networks or switched bussing strategies to allow the different memory banks to connect to the various architectural units. A prefetch unit 650 is provided to sequence instructions out of the embedded DRAM program space 410. The prefetch unit receives sequence start addresses from a type II interface block 660 coupled to the CPU core over the type II instruction interface bus 335 as discussed with respect to FIG. 3. Also, the type II interface block 660 generates the ready signal 325, also discussed with respect to FIG. 3, when instruction sequence completion is signaled by the prefetch unit 650. The prefetch unit 650 also delivers the program address sequence to an optional program cache 645. The optional program cache 645 can be implemented using standard program caching techniques, with a wide word-width cache structure as found on CDRAMs, or by just using active-row sense-amp caching techniques. Instructions are prefetched into an instruction register 680. The instruction register 680 can also be implemented as a dispatch unit to service a plurality of instruction pipelines using a superscalar approach. The fetched instructions are routed from the instruction register/dispatch unit 680 to one or more functional units 655.

In operation, the CPU core 300 fetches and executes an instruction stream originating in the DRAM array 610–613 located on the embedded DRAM 600. Type I and type II instructions are fetched from the CPU core program space 400. These instructions are cached in an L1 caching structure and possibly also cached in an L2 caching structure. This prevents the embedded DRAM from being able to directly monitor the instruction stream executed on the CPU core 300. Whenever a type II instruction is executed on the CPU core 300, related information including a logical address of an associated instruction in the embedded DRAM program memory space is transferred over the interface 335 to the embedded DRAM 600. When this information is received at the interface 660, the logical address vector is forwarded to the prefetch unit 650. The prefetch unit 650 operates to fetch one or more instructions referenced by the received logical address. The program sequence is run to completion as controlled by the prefetch unit 650. The prefetch unit 650 can fetch the instruction sequence from any of the DRAM arrays, but will typically fetch it from DRAM array M3 613. In cases where the program involves looping, the program instructions can be cached in the local program cache 645 to speed the instruction fetching process. Also, the register file 640 serves to cache data being manipulated that may need to be accesses several times. A data cache can be added, but will typically not be used. Rather, the row pointers 610–613 will maintain an active row on the DRAM sense amplifiers, and the optional register file 640 will hold data being reused frequently by the functional units 655. In some embodiments, the functional units 655 will accept data directly from the a DRAM module such as M2 612, in which case the register file 640 may be absent. The instructions are processed by the functional units using standard microprocessor techniques to include superscalar pipelining. When the program executes out of the local program space 410, only type II and type III instructions are executed. When type II instructions are executed, information is generated to be transmitted to the CPU core 300 in order to synchronize operations. As discussed earlier, the CPU core 300 can be configured to be interrupted by in-bound type II information, can poll and wait for such information, or can synchronize its internal pipeline control to the precise clock edge where the results will be delivered over the data bus 320. In the meantime, while the embedded DRAM coprocessor 600 processes information, the CPU core 300 can continue to process instructions and access, for example, the DRAM banks M0 610 and M1 611.

Figure 7:
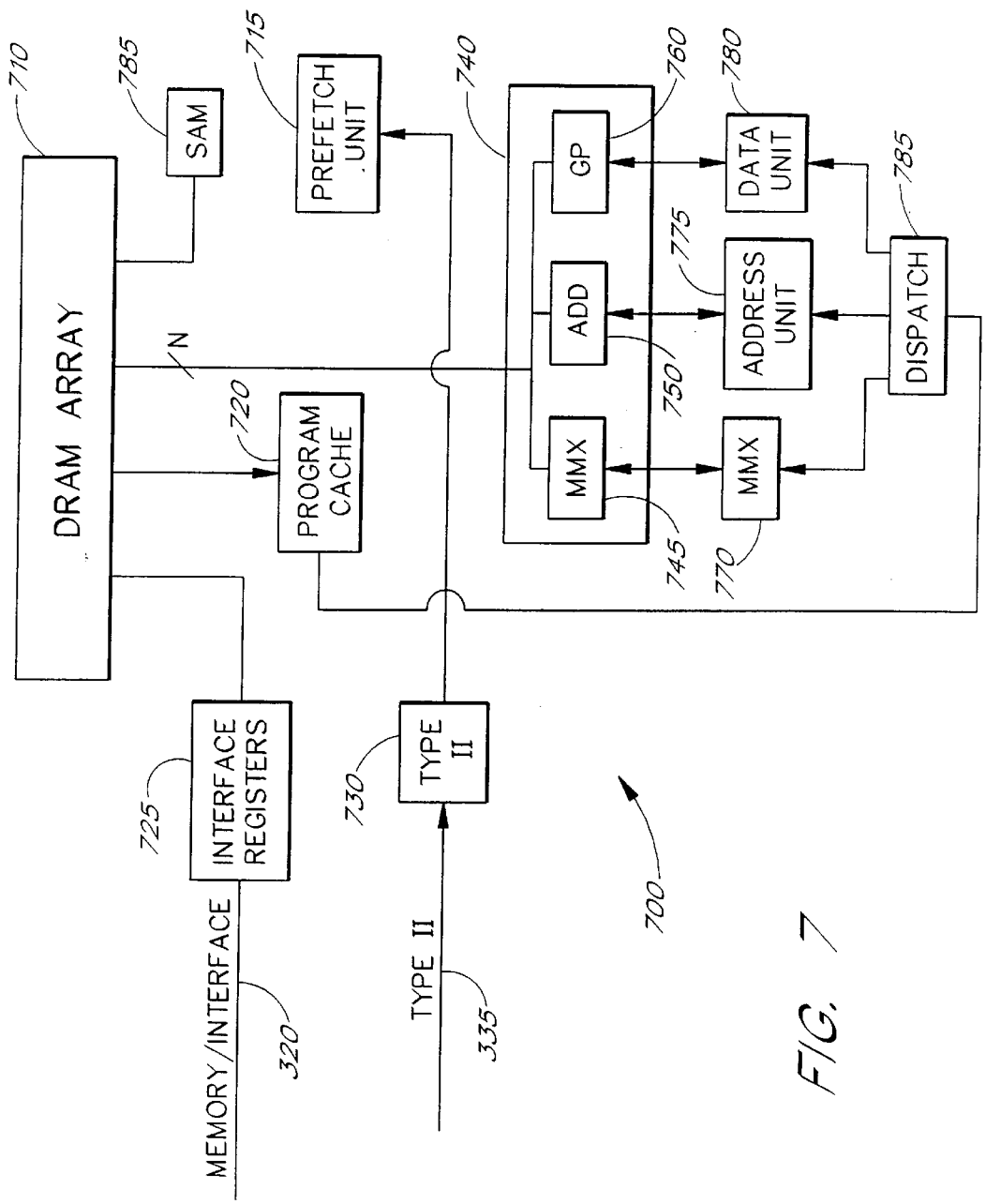
FIG. 7 illustrates the split architecture of an embodiment of the embedded DRAM coprocessor of the present invention.

FIG. 7 illustrates a specific exemplary embodiment of the present invention designed to accelerate graphics and video processing with an Intel Pentium processor. As is well known, the Intel Pentium series of processors includes an architectural extension known as MMX technology. MMX originally stood for "matrix math extensions" and now stands for "multimedia extensions." The MMX technology expands the original Pentium processor architecture and instruction set to reuse the floating point registers as MMX registers that provide for various arithmetic modes, most notably packed pixel processing modes. By using wide registers coupled to wide parallel arithmetic units, pixel processing time can be greatly accelerated. MMX instructions typically are found in tight loops that index over one or more large image structures that often do not fit in either an L1 cache or an L2 cache. Also, in many cases the final results will need to be moved out to Video RAM which is itself a DRAM implemented outside of the caching structure. Also, various bit-block-transfer (BitBLT) operations may be needed to move MMX rendered graphics objects from a rendering buffer area into the screen buffer area. Hence, MMX code can be accelerated by executing the MMX loops in the DRAM itself.

The embedded DRAM coprocessor 700 includes a DRAM array 710 which is preferably implemented similarly to the DRAM array 610, 611, 612, 613, 620, 621, 622, 623 of FIG. 6. The DRAM array 710 may employ the sense amp caching or may additionally include a wide SRAM caching interface as found on known CDRAMs. An output of the DRAM array 710 is coupled to an interface register set 725 which is used to buffer data that moves on or off the chip over the external memory interface 320 as discussed with respect to FIG. 3. The DRAM array 710 is also optionally coupled to a program cache 720 used to accelerate instruction fetching as controlled by a prefetch unit 715. The DRAM array 710 is also optionally coupled to a set of one or more register files 740. Moreover, the DRAM array 710 is optionally coupled to a sequential access memory (SAM) 785 that serves as a video port for a frame buffer. When type II instruction information is received over a type II interface 730, the information is passed to a prefetch unit 715 responsive to generate a local instruction stream. Instructions are prefetched by the prefetch unit 715 from either the DRAM array 710 or the program cache 720 and are forwarded to a dispatch unit 785. The dispatch unit 785 delivers instructions to either a first MMX functional unit 770, to an address calculation unit 775, or to a general purpose data unit 780. The M e functional unit 770 is coupled to an MMX register set 745 which is itself coupled to the DRAM array 710. The address calculation unit 775 is coupled to a set of address registers 750. The data unit 780 is coupled to a set of general purpose registers 760.

The exemplary processor 700 is operative to extend the Pentium architecture by including mirror image functionality. That is, the same program control, integer arithmetic, and MMX instructions can execute on either the Pentium processor or the embedded DRAM coprocessor 700. Also, the same set of MMX and general purpose registers present on the Pentium processor are available on the embedded DRAM coprocessor 700. The dispatch and pipeline control implemented on the embedded DRAM coprocessor 700 is a simpler, streamlined version of what is found on the Pentium. With the embedded DRAM coprocessor 700, for example, the MMX oriented subroutines could alternatively be implemented in an MMX Pentium processor or in the embedded DRAM 700. In this example, the type III instructions are mirror images of type I instructions, but may be restricted to operate on a subset of the registers. With this type of architecture, it becomes possible to segment a pre-compiled application program to advantageously execute certain portions in the embedded DRAM. This allows a future system incorporating a processor with an embedded-DRAM coprocessor interface to execute existing software written for an MMX processor without an embedded-DRAM coprocessor interface. This is also important for applications where a preexisting processor running precompiled application code is to be accelerated by adding an embedded DRAM 700 in the place of existing DRAM SIMMs. To support acceleration where the processor is not aware of the embedded DRAM coprocessor 700, the type II interface 730 is implemented in software using data path 320.

Figure 8:
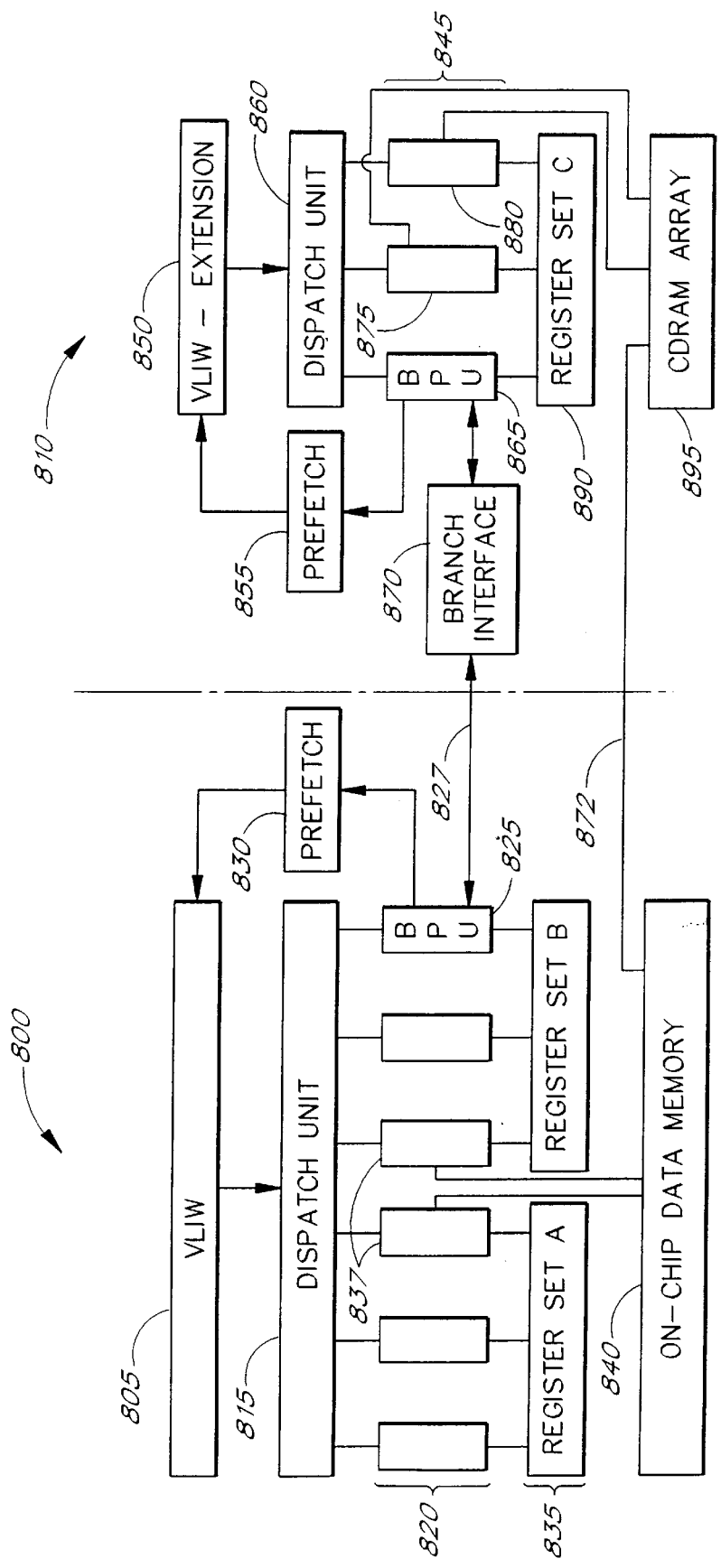
FIG. 8 illustrates an embodiment of the a split VLIW embedded DRAM coprocessor designed in accordance with the present invention.

FIG. 8 illustrates an embodiment of a split VLIW processor designed according to an aspect of the present invention. VLIW processors are used primarily in DSP and multimedia applications. For a full description of an exemplary VLIW processor, the TMS320C62xx, see Texas Instruments document SPRU189B which is incorporated herein by reference. In FIG. 8, a VLIW processor core 800 is coupled to an embedded DRAM VLIW extension processor 810. The VLIW processor core 800 receives a VLIW control word from a VLIW program cache 805. When the VLIW control word is received at the instruction boundary, it is forwarded to a dispatch unit 815 which decides to which of a set of functional units 820 to route individual instruction fields contained in the VLIW control word. The functional units are coupled to a group of registers sets 835, and are also coupled to an on-board data memory area 840. A plurality of load/store functional units 837 are operative to move data between the register sets 835 and the on-board data memory 840. The on-board data memory 840 is coupled via a data bus 872 to an external DRAM array 895 implemented on the embedded DRAM VLIW extension processor 810. The DRAM array 895 is preferably implemented as a cache DRAM with at least a row-sense amplifier caching structure. A branch processing unit (BPU) 825 processes branch instructions on the VLIW processor 800. The branch processing unit 825 is coupled to a prefetch unit 830 which controls the reading of the very long instruction words (VLIWs) out of the VLIW program cache 805. The branch processing unit is also coupled via an external interface 827 to a branch interface module 870 located on the embedded DRAM VLIW extension processor 810. A similar branch interface module (not shown) may optionally reside on the VLIW processor 800. The output of the branch interface module 870 is coupled to a branch processing unit (BPU) 865 on the embedded DRAM VLIW extension processor 810. The branch processing unit 865 is coupled to a local prefetch unit 855 which is itself coupled to an extension VLIW program cache 850. VLIW control words stream out of the extension VLIW cache 850 to a dispatch unit 860. The dispatch unit 860 inspects the VLIW control word and dispatches selected instruction fields to a set of one or more functional units 845. The functional units 845 are coupled to a register set 890. A functional unit 875 and a functional unit 880 are also coupled to the cache DRAM memory array 895.

The VLIW processor 800 and the embedded DRAM coprocessor 810 are operative to jointly execute VLIW programs. That is, the VLIWs read from the cache 805 and the cache 850 form one extended VLIW for the split VLIW processor comprising the VLIW processor 800 and the VLIW extension processor 810. When a program begins, the BPU 825 and the BPU 865 synchronize via the branch interface module 870. The compiler is aware of the extension hardware 810 and treats the embedded DRAM extension processor 810 simply as extra VLIW architectural fields. When the program is compiled, the instructions for the functional units 835 are stored in a VLIW program space serviced by the VLIW program cache 805. The instructions for the functional units 845 are stored in a VLIW extension program space serviced by VLIW cache 850. When a VLIW is fetched from the VLIW program cache 805, a corresponding VLIW extension word is fetched from VLIW program cache 850. To save memory space, the programs in both the VLIW cache 805 and the VLIW extension cache 850 can point to different addresses based on the number of instructions that have been dispatched from the fetched VLIWs. The dispatching of variable numbers of instructions in a VLIW is discussed, for example, in SPRU189B. In the current architecture, the concept is extended to a system that operates in lockstep, but from possibly skewed program addresses. This is readily handled by the compiler and is discussed in greater detail below.

Thus, as a program executes, a VLIW is fetched from the program cache 805 and also from the program cache 850. Next the dispatch units 815, 860 scan the individual instruction fields in the extended VLIW. If, for example, it takes two cycles to dispatch all of the instructions in the VLIW 805 and it takes four cycles to dispatch all the instructions in the VLIW 850, then the two fetch units 830 and 855 will be out of step, but the program can remain in synchronization because synchronization is determined by the position of dispatched instructions as opposed to absolute addresses. In some embodiments, a small synchronization control field can be added to the extension VLIW 850 in order to schedule the dispatching of instructions. For example, the compiler can direct a first set of instructions to be dispatched, then wait two cycles, then dispatch the next group, then wait three cycles, and then dispatch the last group. In some embodiments, a similar synchronization field can be added to the control words stored in the VLIW program cache 805. Alternatively, the opcodes of the instructions may contain delay information. In either case, the inventive concept is to allow a single joint VLIW instruction stream be read out of the VLIW program caches 805 and 850, where, to save memory space, different numbers of instruction fields can be dispatched form each of the VLIWs each execution cycle, and the fetch addresses can slip relative to one another based on the number of dispatched instructions, while synchronization is maintained by encoding delay information into the VLIW instruction stream. Alternatively, the fetch addresses of prefetch units 830 and 855 may be maintained in strict lockstep, but this will not be as efficient in terms of program space usage. Additional control signals may also be sent over the interface 827 to control slippage due to differing instruction execution rates.

As the VLIW processor 800 and the embedded DRAM VLIW processor 810 jointly execute a program, there will be various points in the control flow where branches occur. In the architecture of the present invention, branches are categorized as data dependent and control dependent. In data dependent branching, the decision whether to branch or not is based on data being processed by the program. In control dependent branching, the branch decision is made based on a control variable such as a loop counter. Control dependent branching can occur in a mirror image fashion simultaneously by the prefetch units 830 and 850 without explicit synchronization. If a data dependent branch is processed in the BPU 825, then the result of the branch must be transferred to the embedded DRAM coprocessor 810. In this embodiment, the data dependent branch information travels from the BPU 825 over the line 827 to the branch interface module 870 and on to the BPU 865. In some embodiments, the BPU 865 can similarly execute data dependent branches and similarly synchronize by sending information to the BPU 825.

Another aspect of the inventive split VLIW processor architecture is to provide for a fork and join synchronization construct between the BPU 825 and the BPU 865. While application programs execute, it may become advantageous for the VLIW processor 800 and the embedded DRAM coprocessor 810 to fork off separate execution threads. To implement this, the BPU 825 sends program branch synchronization information over the interface 827. Unlike with data dependent branching, the BPU 825 does not instruct the prefetch unit 830 to follow the branch. For a join, the BPU 825 and the BPU 865 both synchronize through the branch interface module 870 by waiting until both BPUs have asserted the join signal. When both BPUs have asserted the join signal, the branch interface module 870 sends a synchronizing signal, and the BPU 825 responds by signaling the prefetch unit 830 to begin prefetching at the join point of the instruction stream, and the BPU 865 similarly signals the prefetch unit 855 to begin prefetching at the join point of the extension instruction stream.

In other aspects of the split VLIW architecture of FIG. 8, the embedded DRAM VLIW processor 810 has access to the large DRAM array 895. In some applications, an optional sequential access memory (not shown) may be connected to the DRAM array 895 to implement a video RAM frame buffer on the same chip. The DRAM array 895 is preferably implemented as a cache DRAM whereby row pointers activate multiple rows of multiple DRAM banks as shown in FIG. 6. Optionally SRAM buffers may be employed in the CDRAM array 895 to cache one row in a bank while another row is being precharged. The CDRAM 895 is preferably implemented with a synchronous interface and wide multi-word data busses. The CDRAM array 895 may or may not be implemented with an access protocol such as found on RDRAMs. Moreover, the bus 872 provides external access to the CDRAM array, and provides for external control also preferably implemented with a synchronous interface using a prescribed interface protocol. In operation, a DMA will typically move data between the CDRAM array 895 and the VLIW processor 800's on-chip data memory 840. Also, the functional units 837, 875 and 880 with load/store capabilities can preferably read and write to all locations of the data memory spaces 840 and 895. The architecture of FIG. 8 is well suited to applications where large data structures such as decoded video reside in the CDRAM array 895. In video decoding, compute-bound tasks such as the discrete cosine transform are advantageously computed in the VLIW processor 800. Meanwhile, I/O-bound computations such as motion compensation are processed directly by the VLIW extension processor 810.

Figure 9:
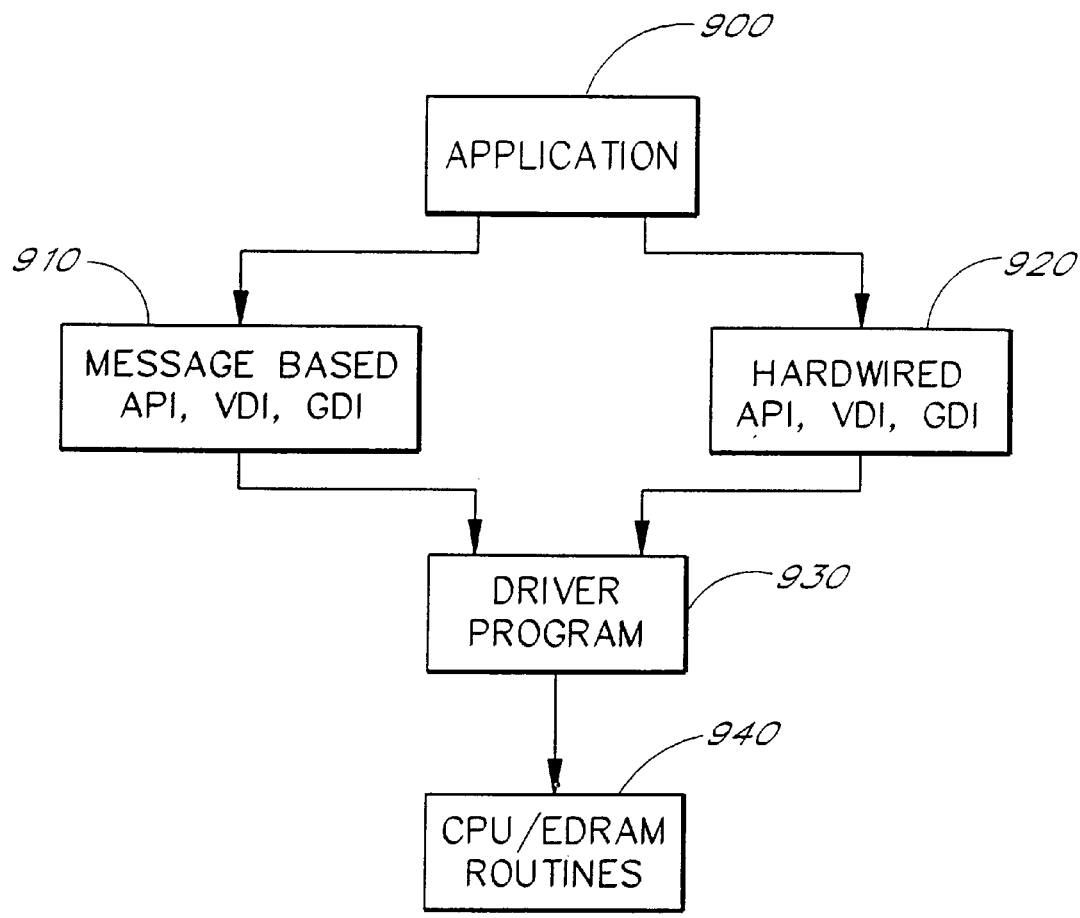
FIG. 9 illustrates a method to use an embedded DRAM coprocessor with standard pre-packaged software.

FIG. 9 illustrates a method to allow standard applications programs to be accelerated by an embedded DRAM coprocessor without the need to change the application software itself For purposes of illustration, the method will be discussed with regard to the acceleration of video decoding and graphics operations using a Windows-type operating system. FIG. 9 illustrates the software layers involved in implementing the method. For example, the application software makes operating system calls to implement functions such as video decoding, BitBLT operations, line drawing, polygon drawing operations, as well as other graphics related operations. An application program 900 makes a call to an application programmer interface (API) routine that generates an operating system message in block 910. This message activates an operating system level driver routine 930 which implements the desired functionality. Optionally, for purposes of speed enhancement, a second block 920 is added to the operating system that bypasses the messaging protocol and directs the API request directly to the driver routine 930. The driver routine 930 passes the request to a lower level device driver routine 940 that exercises the split architecture between the CPU core on which the driver program is executed and the hardware in the embedded DRAM coprocessor of, for example, FIG. 6 or FIG. 7. The device driver can be implemented using the type I, type II and type III instructions as discussed with respect to FIGS. 4–7. When the device driver executes, it uses the CPU core 300 and the embedded DRAM 310 split architecture. If the embedded DRAM architecture 600 includes the SAM 690 to implement a VRAM, then the embedded DRAM coprocessor 600 is able to implement the full video decoder and graphics processing functions in the frame buffer itself. Note that this method enables a split architecture system to execute standard application software written without knowledge of the split architecture. The split architecture is only exercised by operating system drivers that the application program already calls using a defined standard interface such as an API, GDI, or VDI.

Figure 10:
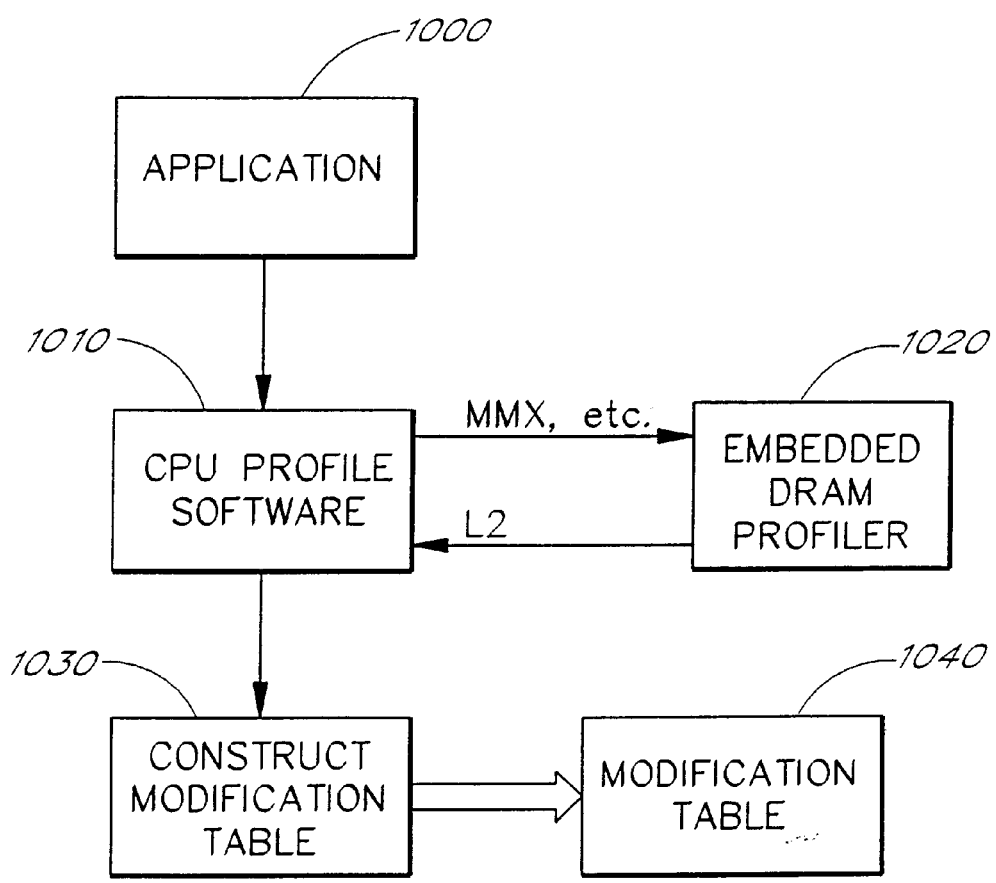
FIG. 10 illustrates static and dynamic methods to analyze pre-packaged software to accelerate it with an embedded DRAM coprocessor.

FIG. 10 illustrates a more general method that allows the embedded DRAM coprocessor to execute standard applications programs written without knowledge of the embedded DRAM coprocessor hardware. This method can be used in conjunction with the previous method illustrated in FIG. 9. FIG. 10 illustrates the software arrangement used in the method. In one embodiment, the application program 1000 is executed in a training session mode while being monitored by an execution profiler 1010. The execution profiler 1010 interacts with an embedded DRAM execution profiler 1020 that monitors DRAM traffic. The profilers 1010 and 1020 work together to identify segments of the program that spend at least a prespecified percentage of execution time waiting for DRAM accesses. Such program segments are said to be DRAM bound. We note that this method can be applied to systems with L2 caches. In such cases, the profilers 1010 and 1020 will analyze both the L1 cache miss rate and the L2 cache miss rate to determine the waiting time due to I/O. The execution profiler output is assembled on the profiler 1010 and is fed to a modification manager 1030 that produces a modification table 1040 that identifies code segments to run on the embedded DRAM coprocessor. For example, a loop of code that manipulates a data array stored in external memory could easily be identified by an execution profiler of normal design. While executing, the application code will generate a sequence of memory addresses that create a memory traffic profile. If the memory traffic profile indicates a large data structure is being manipulated, the profiler will mark this code. Also, for example, if the code additionally includes MMX instructions, then the portion of the code could further be identified as graphics manipulation code.

By using an embedded DRAM coprocessor designed according to FIG. 6 and FIG. 7, portions of the code can be moved to the embedded DRAM coprocessor, possibly with the need to insert instructions to move register contents back and forth before and after execution. The profiler can decide to move loop structures or whole subroutines that generate the offending traffic patterns that give rise to cache thrashing. The concept of mirror imaging at least a portion of the CPU core architecture on the embedded DRAM allows the code to be executed by either processor and to be reallocated under program control by a profiler. The modification tables 1040 are used by the modify/monitor unit 370 in order to alter the program to be executed by a version of the CPU core 300 interfaced to an embedded DRAM 310 with or without the explicit interfaces 330, 325 and 335. Using this method, a standard application program can be modified to run on a split architecture. Also, by modifying the program to insert instructions to implement the register transfer and synchronization primitives, all communication between the CPU core 300 and the embedded DRAM coprocessor 310 can proceed over the standard memory bus 320 under software control. Therefore, this method of profiling and code modification allows an embedded DRAM coprocessor 310 to be designed with a standard interface and attached to accelerate program execution on processor of normal design. In this case, the DRAM SIMMs on an existing computer are changed for intelligent embedded DRAM coprocessors 310 designed with only a standard SIMM pin-out. When the intelligent SIMMs are loaded, software which includes the profiler is also loaded onto the system. Also, the program loader portion of the operating system is updated so that when standard application software is loaded, the modification tables 1040 are also loaded into the embedded DRAM coprocessor 310. The modify/monitor unit 370 then insures that the actual program executed by the processor 300 is modified to allow the embedded DRAM coprocessor 310 to execute the I/O-bound portions of the program. In this case, certain APIs, GDIs and VDIs can also be reloaded with optimized split architecture code to allow the method of FIG. 9 to be employed concurrently.

The program modification method of FIG. 10 can optionally be implemented as a static or dynamic translator. In a static translator, a compiler-like program parses the application machine code. This translator evaluates code by looking at load and store arguments, loop boundaries, and other information contained in the program. The translator then determines which portions of the program involve memory intensive operations and produces a modified program for subsequent execution for use with the embedded DRAM coprocessor 310. This translation may be performed just prior to code execution, which is known as just-in-time compilation in the art. This type of translation views the original processor for which the software was written as a virtual machine. Then it views the code to be translated as virtual machine code and translates the virtual machine code to the target machine code using prior art techniques. In dynamic translation, the modify/monitor unit identifies segments to dispatch to the embedded DRAM coprocessor functional units using a similar approach at run-time. This method has the advantage that the software is never modified. Thus, the software can run directly from, for example, a CD-ROM without the need to maintain modification tables. Also, this method can be extended to allow a processor without certain architectural extensions, such as MMX technology, to execute a program written for a processor with the architectural extensions. In this case, the portions of the program including the opcodes relating to the instruction set extension are tagged to be executed in the embedded DRAM coprocessor.

Figure 11:
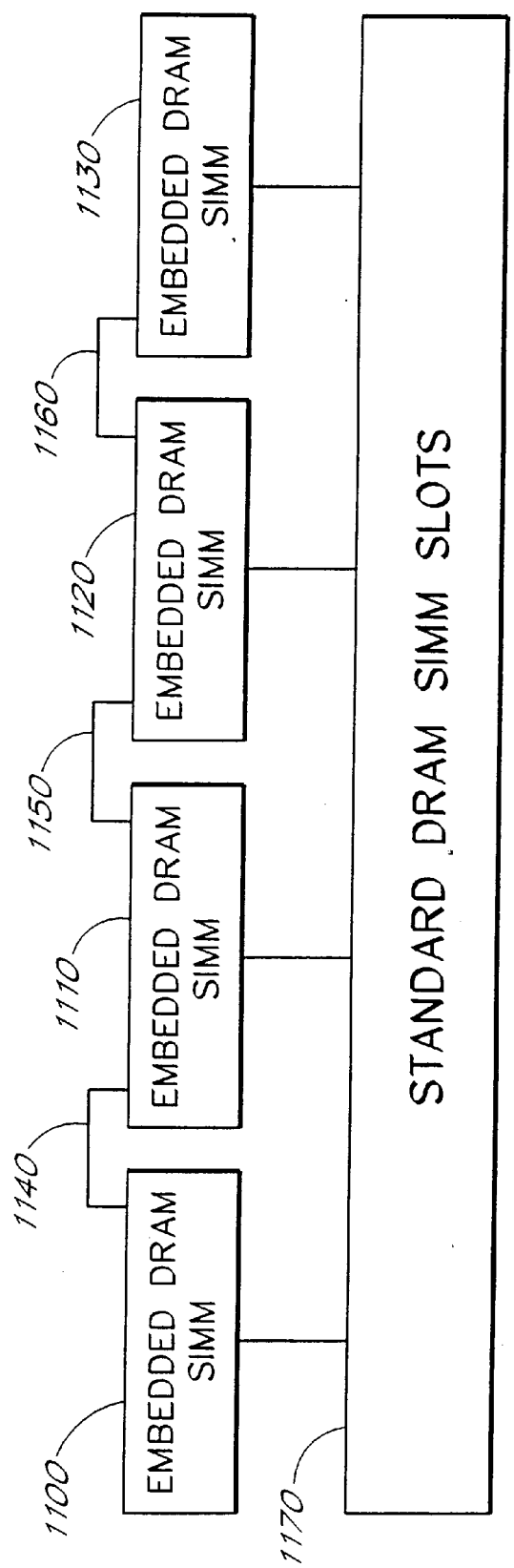
FIG. 11 illustrates the population of standard DRAM SIMM sockets with embedded DRAM accelerators that include optional cross-data paths.

FIG. 11 illustrates an interconnection strategy for an embedded DRAM SIMM accelerator that views each embedded DRAM as a bit slice unit. In FIG. 11, a collection of embedded DRAM coprocessors 1100, 1110, 1120, 1130 are connected via standard DRAM SIM interfaces into standard DRAM SIMM slots 1170 as commonly found on personal computer and work station motherboards. A set of optional secondary connectors 1140, 1150, and 1160 interconnect the embedded DRAM coprocessors 1100, 1110, 1120, and 1130 as shown. For example, in the system of FIG. 11, each SIMM may be taken to be sixteen bits wide. Then, the illustrated set of four SIMMs 1100, 1110, 1120, and 1130 spans a 64-bit wide bus. When certain loops execute on this system, for example, MMX loops, the different bit fields are processed individually and the same program executes separately on all the different bit slices. In certain cases, information such as carry bits may need to move between chips. Thus communication interfaces are optionally included on each embedded DRAM SIMM 1100, 1110, 1120, and 1130 to support the transfer of data between modules across the connectors 1140, 1150, and 1160.

Although the present invention has been described with reference to a specific embodiment, other embodiments occur to those skilled in the art. For example, the type II instructions executed by the CPU core 300 could send physical address information to the embedded DRAM 310. Also, a type II instruction could reference the logical or physical address of a type III instruction. In this case, for a type II instruction T(j), there may be no corresponding type II instruction T'(j). The instruction fields in the type II instructions could encode the disclosed information in various ways without using distinct and separate bit fields and could be labeled differently. Also, type II instructions could be implemented as pairs of type I and type III instructions that perform load and store type operations to pass data and control words back and forth. Moreover, type II instructions may be split into multiple instructions to allow command address parameters to be sent to the embedded-DRAM 310 a fixed amount of time before the results will be needed by the CPU 300. In FIGS. 6 and 7, the interface register blocks may additionally contain a modify/monitor unit operative to modify the instruction stream into the CPU core and to redirect portions of this instruction stream to the functional units on the embedded DRAM coprocessor. Different types and numbers of DRAM banks and functional units could be used in various embodiments. Also, instead of an API as expressly defined, for example, by Microsoft, Inc., the API of FIG. 9 could include any operating system level interface routine called by an application program to invoke a service. It is to be understood therefore, that the invention herein encompasses all such embodiments that do not depart from the spirit and scope of the invention as defined in the appended claims.

What is claimed is:

1. An embedded dynamic random access memory (DRAM) coprocessor system implemented as a plurality of individual bit slice units having single in-line memory module (SIMM) interface connectors adapted for interchange with standard DRAM SIMMs disposed on electronic component boards.

2. The embedded DRAM coprocessor system of claim 1, further comprising an additional interface connector which connects at least two of the embedded DRAM bit slice units together via a separate bus not found on the computer board into which the bit slice units are plugged.

3. The embedded DRAM coprocessor system of claim 1, wherein the bit slice width of the each SIMM multiplied by the number of SIMMs in the system is equal to the bus word width of the processor with which the memory modules are in data communication.

4. The embedded DRAM coprocessor system of claim 2, further comprising a communications interface adapted for data communication between respective ones of said individual bit slice units via said bus.

5. An embedded dynamic random access memory (DRAM) coprocessor comprising individual means for bit slicing, said means for bit slicing having in-line memory module (SIMM) interface means for interfacing with respective in-lime memory module slots disposed on an electronic component board.

6. The embedded DRAM coprocessor of claim 5, further comprising:

interface connector means for connecting at least two of the means for bit slicing together via a separate bus means not found on the computer board into which the individual means for bit slicing are plugged; and communications interface means for communicating data between said at least two means for bit slicing via said bus means.

7. A method of communicating data between an embedded DRAM processor and a host computing system having an electronics board with a plurality of SIMM interfaces, comprising:

providing a plurality of embedded DRAMs in the form of bit slice units;

connecting each of said plurality of bit slice units to said electronics board via respective ones of said SIMM interfaces;

connecting at least two of said plurality of bit slice units together using at least one bus;

transferring data between at least one of said bit slice units and said host system; and transferring data between said at least two bit slice units.

8. The method of claim 7, further comprising configuring said at least two bit slice units to communicate data with each other.

9. A method of accelerating the processing of data on a host computing system having an electronics board with a plurality of SIMM interfaces, and a host processor in data conmmunication with said electronics board, comprising:

providing a plurality of embedded DRAMs coprocessors in the form of bit slice units, said bit slice units being adapted for processing data in cooperation with said host processor;

connecting each of said plurality of bit slice units to said electronics board via respective ones of said SIMM interfaces;

connecting at least two of said plurality of bit slice units together using at least one bus; and executing a computer program on at least said host processor, said act of executing initiating the acts of:

transferring data between at least one of said bit slice units and said host system;

transferring data between said at least two bit slice units; and processing at least a portion of said data transferred between said at least one bit slice unit and said host system using at least one of said bit slice units;

wherein the acts of transferring and processing accelerate the processing of data within said host system.

10. The method of claim 9, further comprising configuring said at least two bit slice units to communicate data with each other.

11. An embedded dynamic random access memory (DRAM) coprocessor system comprising:

a plurality of individual bit slice units, each bit slice unit comprising:

a plurality of DRAM cells;

a processing unit; and a communications interface adapted for data communication with at least one other bit slice unit.

12. The embedded DRAM coprocessor system of claim 11, whereby each bit slice unit is implemented on a separate die.

13. The embedded DRAM coprocessor system of claim 11, whereby each bit slice unit is implemented on a separate memory module circuit board.

14. The embedded DRAM coprocessor system of claim 13, whereby each memory module circuit board is a single in-line memory module (SIMM) adapted for interchange with standard DRAM SIMMs disposed on electronic component boards.

15. The embedded DRAM coprocessor system of claim 13, wherein at least two memory module circuit board further comprise:

a SIMM connector interface adapted for interchange with standard DRAM SIMMs disposed on electronic component boards and for communication with a host processor; and at least one bus connector interface adapted for interconnection with at least one other memory module circuit board containing one of said bit slice units.

16. The embedded DRAM coprocessor system of claim 11, further comprising:

one or more module circuit boards adapted for interchange with standard DRAM SIMMs disposed on electronic component boards;

whereby onto each of said memory module circuit boards is mounted a single bit slice unit.

17. The embedded DRAM coprocessor system of claim 11, whereby a host computer sends at least one instruction to at least one of said bit slice units to cause at least two of said bit slice units to process data stored within in their respective DRAM cells, and said bit slice units pass data therebetween using said communication interface.

18. In a processing system comprising a host processor coupled to an embedded DRAM coprocessor subsystem, whereby said embedded DRAM coprocessor comprises a plurality of individual bit slice units, each bit slice unit comprising an array of DRAM cells, a processing unit, and a communications interface adapted for data communication with at least one other bit slice unit, a method comprising:

storing a data structure as a distributed object having components in at least two of said arrays of DRAM cells;

sending a command from said processor to at least one of said bit slice units over a first data bus adapted to support communication between said processor and said embedded DRAM coprocessor subsystem;

executing in at least two of said bit slice units at least one program to process portions of said distributed data object stored in respective arrays of DRAM cells using the respective processing unit; and passing at least one bit of information between said at least two bit slice units using said communications interface in support of the act of executing.

19. The method of claim 18, whereby the act of sending further involves passing said at least one instruction to said at least one bit slice unit via a single in-line memory module (SIMM) interface connector adapted for interchange with standard DRAM SIMMs disposed on electronic component boards.

20. The method of claim 19, whereby said host processor is mounted on a mother board, at least one bit slice unit is mounted on sub-circuit board comprising said single in-line memory module (SIMM) interface connector, said single in-line memory module (SIMM) interface connector is connected to said mother board, and the act of passing involves sending said at least one bit of information is across an inter-SIMM interface connector involving a data path that is not a part of the motherboard.

* * * * *

UNITED STATES PATENT AND TRADEMARK OFFICE
CERTIFICATE OF CORRECTION

PATENT NO. : 6,760,833 B1
DATED : July 6, 2004
INVENTOR(S) : Eric M. Dowling

It is certified that error appears in the above-identified patent and that said Letters Patent is hereby corrected as shown below:

Title page,
Item [60], Related U.S. Application Data,
"[60] Continuation of application no. 09/487,639, filed on Jan. 19, 2000, now Pat. No. 6,226,738, which is a division of application no. 08/997,364, filed on Dec. 23, 1997, now Pat. No. 6,026,478." should read:
-- [60] Continuation of application no. 09/487,639, filed on Jan. 19, 2000, now Pat. No. 6,226,738, which is a divisional of application no. 08/997,364, filed on Dec. 23, 1997, now Pat. No. 6,026,478. --

Column 3,
Lines 22-24, "describe such systems. For example, U.S. Pat. No. 5,396,641 discloses a memory based processor that is designed increase processor-memory bandwidth. In this system, a set" should read -- describe such systems. For example, U.S. Pat. No. 5,396,641 discloses a memory based processor that is designed to increase processor-memory bandwidth. In this system, a set --

Column 8,
Lines 16-19, "processing unit. Also preferably, the register file further includes a set of multimedia extension (MX) registers., and the functional units include one or more MMX functional units." should read -- processing unit. Also preferably, the register file further includes a set of multimedia extension (MMX) registers, and the functional units include one or more MMX functional units. --

Column 13,
Lines 20-22, "FIG. 8 illustrates an embodiment of the a split VLIW embedded DRAM coprocessor designed in accordance with the present invention." should read
-- FIG. 8 illustrates an embodiment of a split VLIW embedded DRAW coprocessor designed in accordance with the present invention. --

Column 18,
Lines 5-6, "specifies at least one opcode to be executed by one or more embedded. DRAM functional units. An optional third field" should read -- specifies at least one opcode to be executed by one or more embedded DRAM functional units. An optional third field --

Column 19,
Lines 42-43, "Also, the register file 640 serves to cache data being manipulated that may need to be accesses several times. A data" should read -- Also, the register file 640 serves to cache data being manipulated that may need to be accessed several times. A data --

UNITED STATES PATENT AND TRADEMARK OFFICE
CERTIFICATE OF CORRECTION

PATENT NO. : 6,760,833 B1
DATED : July 6, 2004
INVENTOR(S) : Eric M. Dowling

It is certified that error appears in the above-identified patent and that said Letters Patent is hereby corrected as shown below:

<u>Column 20,</u>
Lines 46-47, "The M e functional unit 770 is coupled to an MMX register set 745 which is itself coupled to a DRAM array 710. The" should read -- The MMX functional unit 770 is coupled to an MMX register set 745 which is itself coupled to a DRAM array 710. The --

<u>Column 25,</u>
Lines 62-63, "of embedded DRAM coprocessors 1100, 1110, 1120, 1130 are connected via standard DRAM SIM interfaces into" should read -- of embedded DRAM coprocessors 1100, 1110, 1120, 1130 are connected via standard DRAM SIMM interfaces into --

<u>Column 28,</u>
Lines 16-18, "The embedded DRAM coprocessor system of claim 13, wherein at least two memory module circuit boards further comprise:" should read -- The embedded DRAM coprocessor system of claim 13 , wherein at least two memory module circuit boards further comprise: --

Signed and Sealed this

Fifth Day of October, 2004

JON W. DUDAS
*Director of the United States Patent and Trademark Office*